United States Patent [19]

Hung

[11] Patent Number: 5,121,196
[45] Date of Patent: Jun. 9, 1992

[54] COLOR PROCESSING METHOD AND APPARATUS WITH A COLOR PATCH

[75] Inventor: Pochieh Hung, Tokyo, Japan

[73] Assignee: Konica Corporation, Tokyo, Japan

[21] Appl. No.: 437,507

[22] Filed: Nov. 16, 1989

[30] Foreign Application Priority Data

Nov. 18, 1988 [JP] Japan ................................. 63-291813
Feb. 28, 1989 [JP] Japan ................................. 1-46827

[51] Int. Cl.⁵ ............................................. H04N 1/46
[52] U.S. Cl. ........................................ 358/75; 358/80
[58] Field of Search ........................................ 358/75

[56] References Cited

U.S. PATENT DOCUMENTS

| | | | |
|---|---|---|---|
| 4,590,515 | 5/1986 | Wellendorf | 358/75 |
| 4,682,216 | 7/1987 | Sasaki et al. | 358/75 X |
| 4,717,954 | 1/1988 | Fujita et al. | 358/75 X |
| 4,887,151 | 12/1989 | Wataya | 358/75 X |

FOREIGN PATENT DOCUMENTS 1595122  8/1981  United Kingdom .

Primary Examiner—Kenneth A. Wieder
Assistant Examiner—Glenn W. Brown
Attorney, Agent, or Firm—Finnegan, Henderson, Farabow, Garrett and Dunner

[57] ABSTRACT

A method of determining a combination of Yellow, Magenta, Cyan, and Black color densities from a color value expressed in a color space, comprising the steps of; providing a predetermined number of color patches in which colors on the color patches are arranged different from each other, measuring color values of the colors on the color patches in which the combination of Yellow, Magenta, Cyan, and Black color densities corresponding to each one of the color patches is predetermined, determining color values of a predetermined number of supplementary colors, which are different from the colors on the color patches, according to the color values of the color patches, and determining the combination of Yellow, Magenta, Cyan, and Black color densities, corresponding to each one of the supplementary colors, according to the color values of the supplementary colors.

5 Claims, 24 Drawing Sheets

FIG. 8
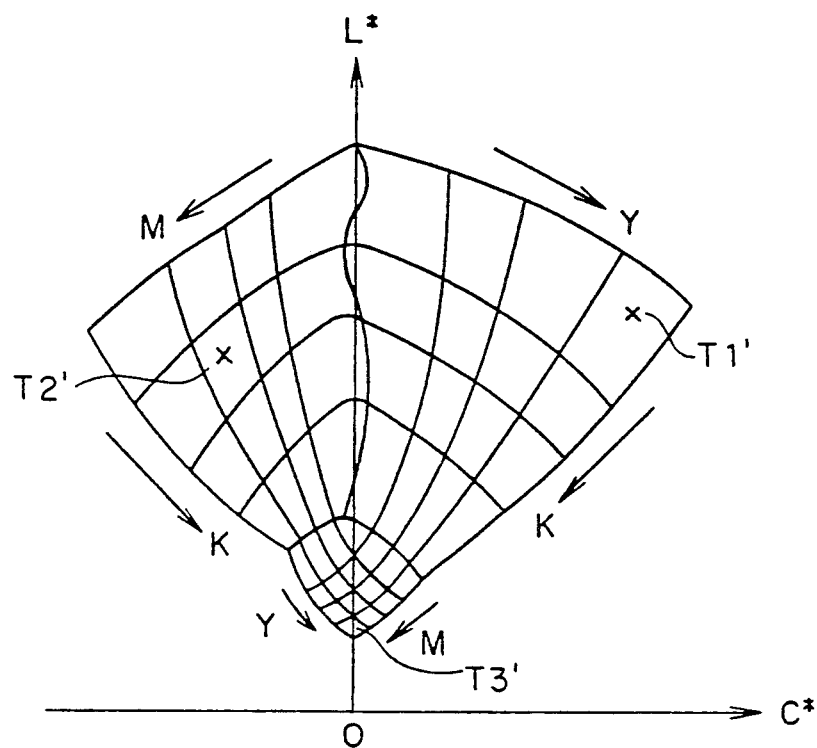
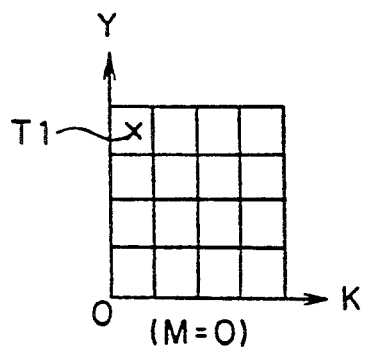
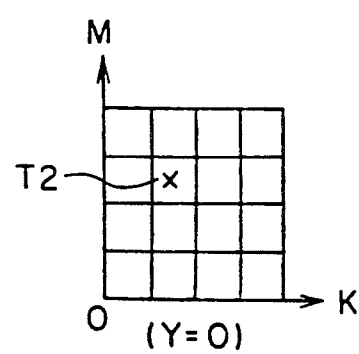
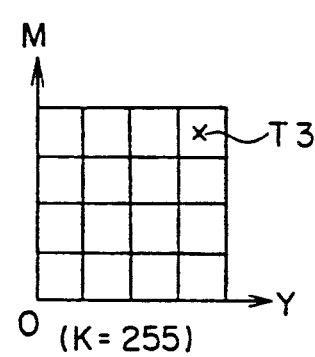
FIG.9A  FIG.9B  FIG.9C

FIG. 23
| NUMBER (ADDRESS) | 0 | 1 | 2 | 3 | ... | 12 | 13 | ... | 30 | 31 |
|---|---|---|---|---|---|---|---|---|---|---|
| COLOR COMPENSATION DATA | 0 | 8 | 16 | 24 | ... | 96 | 104 | ... | 240 | 248 |
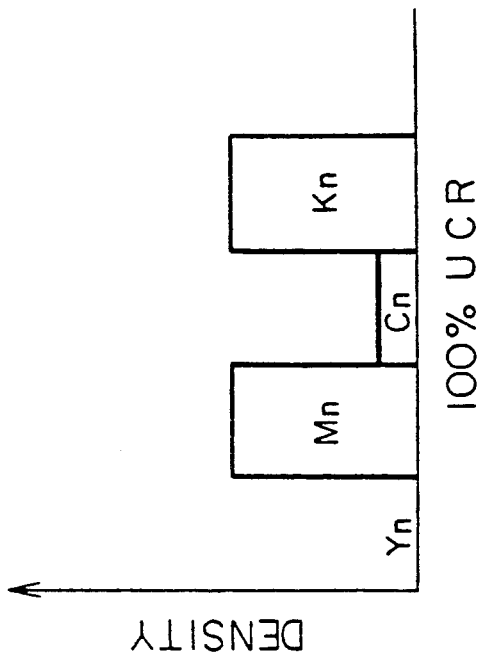
FIG. 24B
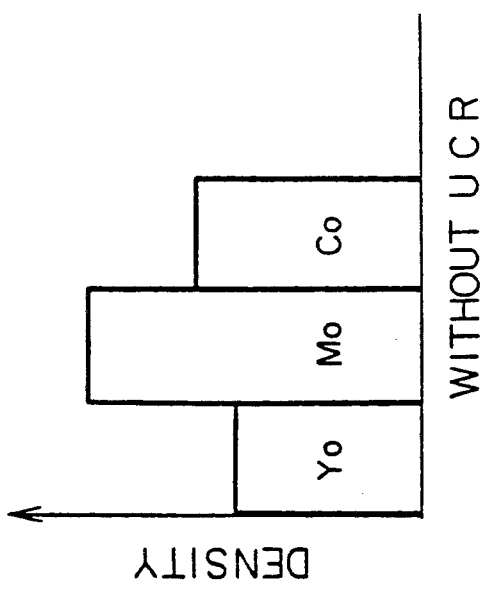
FIG. 24A $$P' = \frac{1}{V_{ABCG}}(V_{BCGP} \cdot A' + V_{ACGP} \cdot B' + V_{ABGP} \cdot C' + V_{ABCP} \cdot G')$$

$$P' = \frac{1}{V_{ABCG}}(V_{BCGP} \cdot A' + V_{ACGP} \cdot B' + V_{ABGP} \cdot C' + V_{ABCP} \cdot G')$$

5,121,196

COLOR PROCESSING METHOD AND APPARATUS WITH A COLOR PATCH

BACKGROUND OF THE INVENTION

This invention relates to an estimation method for color reproduction characteristics using color patches suited for exactly estimating an input color component image signal corresponding to provided color coordinates, which reduces the color reproduction characteristics estimation processing time and improves the color reproduction characteristics.

For full color printers such as the general printers, thermal dye transfer printers, ink jet printers, and electrophotographic printers, four colors such as Yellow, Magenta, Cyan and Black (Y, M, C, and K) are often used as output colors of a color printer.

To represent all colors by using the four colors, there are various methods developed to combine Y, M, C, and K. Those methods are generally called "Under Color Removal" (UCR). The 100% UCR method is one of the concrete methods.

The 100% UCR method is a method to replace the smallest density of the original colors Y, M, and C ($Y_o$, $M_o$, and $C_o$) with the density of the black K as shown in FIG. 24. When $Y_o$ is the smallest density as shown in the FIG. 24A, it is replaced as shown in the FIG. 24B by the 100% UCR method. The densities after replacement are $Y_n$, $M_n$, $C_n$, and $K_n$ ($Y_n=0$).

The 100% UCR method is characterized in that:

The operation reliability is increased.

The gray balance is stable.

Ink can be economized on.

Slight instability of ink can be eliminated.

The energy for drying ink can be conserved, and problems on drying are reduced in number. This is because the amount of K ink can be reduced to about ⅓ of the total amount of corresponding Y, M, and C inks.

To determine color reproduction characteristics of Y, M, C, and K, it is possible to prepare a few color patches using discrete combinations of Y, M, C, and K and to measure the patches by a colorimeter, and to estimate color reproduction characteristics of Y, M, C, and K of combinations other than the above by interpolating and operating the color values or to estimate a color value of some combination of Y, M, C, and K.

When specific color coordinates are specified inversely, the combination of Y, M, C, and K indicating the color coordinates can be estimated by interpolating and operating the actually measured color value using a color patch.

By estimating all combinations of Y, M, C, and K using color patches prepared on the basis of discrete combinations of Y, M, C, and K, the combination of Y, M, C, and K can be estimated from the actually measured color value. This method increases the estimation accuracy and improves the color reproduction characteristics.

FIG. 25 shows an example of color patches prepared by a discrete combination of Y, M, C, and K. In the figure, the maximum values of Y, M, C, and K are 2 to the 8th power, and the color patches provide color densities of five stages of 64 steps.

When color coordinates are provided as shown above or an electric signal (for example, R, G, and B color component image signals) equivalent to the color coordinates is provided, a color output correction means for obtaining a combination of Y, M, C, and K from the data is required.

FIG. 26 shows an example of the means. A color masking device 10, which is one of the color resolution image correction devices, is installed prior to a printer 12. The R, G, and B color resolution image signals equivalent to the color coordinates are converted to a combination of Y, M, C, and K color signals by the color masking device 10, which are supplied to the printer 12 to generate an image. The image is stored on a storage medium 13.

The 100% UCR method has the advantages mentioned above, though the method has the disadvantages given below, which may cause degradation of the color reproduction characteristics.

The saturation is generally lowered.

When the black component is increased, the density is decreased.

The present invention provides a method for improving the color reproduction characteristics, whose degradation is one of the disadvantages of the 100% UCR method, and for estimating color reproduction characteristics by using a fewer color patches when the color reproduction characteristics estimation method using color patches are to be adopted.

SUMMARY OF THE INVENTION

The color reproduction characteristics estimation method of the present invention for estimating a combination of yellow Y, Magenta M, cyan C, and black K indicating the specified color coordinates, which is designed to solve the problems mentioned above, is characterized in that:

among all the combinations of Y, M, C, and K indicating the provided color coordinates, a combination of Y, M, C, and K in which K is the maximum density, is determined at each specific point of the discretely provided color coordinates, color patches of the discrete combinations of Y, M, C, and K are provided, and the densities of Y, M, C, and K corresponding to color coordinates, other than the above specific points corresponding to the provided color patches, are estimated from the colorimetrized values of the prepared color patches.

When a color coordinate is given, there are generally innumerable combinations of Y, M, C, and K for representing the color. To choose one combination from the innumerable combinations, the condition that the value of K in the combination is the maximum is introduced.

This condition is a condition that the value of one of Y, M, and C is the minimum density or K is the maximum density (this is nothing else but a solid Black print). The 100% UCR method using a condition (an improved condition) that "K is the maximum within the range that a given density color can be represented" is called the improved 100% UCR method for convenience' sake. The improved 100% UCR method improves the color reproduction characteristics compared with the conventional method.

Necessary color patches can be determined by this improved condition (FIGS. 1, 3, and 5) and the number of the color patches can be reduced. Therefore, we will describe the first embodiment of a color component image correction device using this invention in detail. However, this method requires operations, causing the processing time to be longer.

Therefore, the present invention also provides the second embodiment of a color component image correction device for reducing the processing time without failure.

This second embodiment is characterized in that:

a data storage means for dividing the color data space formed by n-color resolution image data (n is an integer not less than 2), inputted for color correction, into a plurality of basic lattices, and for storing image data of yellow Y, Magenta M, cyan C, and black K, located at the lattice vertexes of the color data space, for the n-color resolution image data is provided, a weight (compensation) factor generation means for generating the weight factor for each of the n+1 image data which are the combinations of Y, M, C, and K, and are selected by the data storage means corresponding to the inputted n-color component image data, is provided a processing means for outputting the image data of Y, M, C, and K, which is processed from the n+1 image data of Y, M, C, and K selected by the data storage means corresponding to the inputted n-color component image data; and processed by the multiplication and accumulation with the weight factors generated by the weight factor generation means, is provided, and the n+1 image data of Y, M, C, and K are the image data which are the combinations of Y, M, C, and K for the n-color component image data located at the n+1 vertexes in the divided data space formed so that said basic lattices contain dividing lines in parallel with the achromatic color axis (Gray Scale).

The configuration of the above second embodiment reduces the interpolation time because the interpolation is performed using a divided data space with a minimum number of vertexes such as a triangular pyramid for three dimensions by 3 inputs or a hyper-triangular pyramid (a four-dimensional triangular pyramid) for four dimensions by 4 inputs.

When a divided data space with a minimum number of vertexes is formed, for example, so that said data space contains a dividing line intersecting the achromatic color axis orthogonally, an interpolation error may be caused. In the above configuration, since a divided data space with a minimum number of vertexes is formed so that said data space contains a dividing line in parallel with the achromatic color axis, an interpolation error can be suppressed.

BRIEF DESCRIPTION OF THE DRAWINGS

FIG. 8 shows the L*u*v* color specification system, FIG. 9 shows the Y, M and K coordinate systems, FIG. 24 is an illustration for the 100% UCR method.

DETAILED DESCRIPTION OF THE INVENTION

Figure 1:
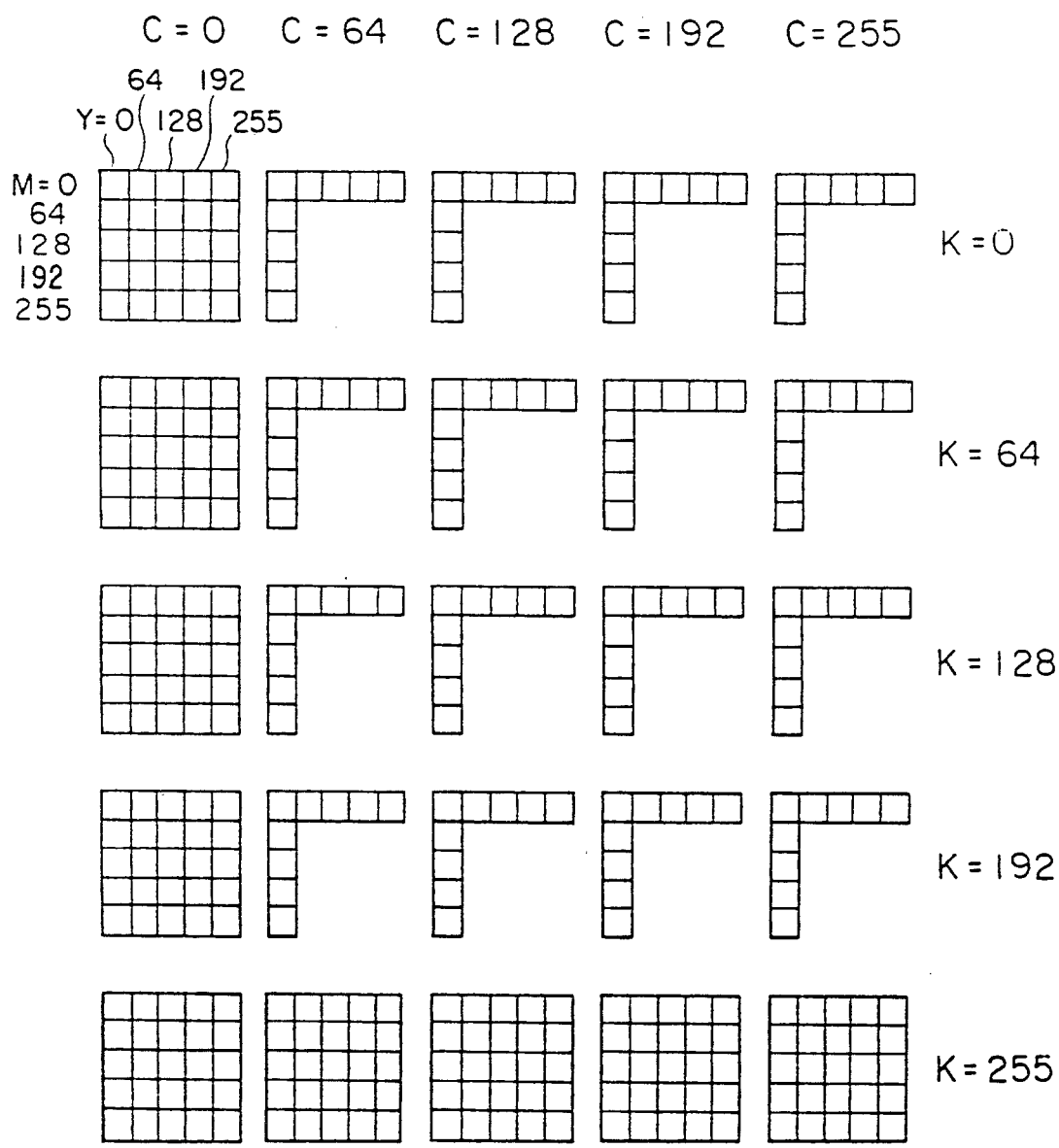
FIG. 1 shows color patches by the 100% UCR method to be used for description of the present invention.

Descriptions of the color reproduction characteristics estimation method using color patches related to the present invention with reference to FIG. 1 and the following drawings follow:

There are innumerable combinations of Y, M, C, and K for representing the color of given color coordinate.

In order to limit the innumerable combinations into one, we choose to set the condition that K in the combination should be the maximum density.

This is because, since a variety of values can be assigned to K within the scope indicating the color coordinates, determination of the maximum value of K allows for determination of a combination of Y, M, and C.

This condition indicates that one of Y, M, and C is the minimum density or K is the maximum density; this condition is satisfied by the cases as indicated below.

$Y = 0,$ $M = 0,$ $C = 0,$ or $K = 255$ (the maximum value)     (1)

A color solid determined under the above condition is a color reproduction scope.

According to the 100% UCR method, if one of Y, M, and C is replaced with K, the replaced color of the minimum density becomes 0; however, when K is the maximum density under the above indicated condition, one of Y, M, and C does not always become 0. This is called an improved 100% UCR method for convenience' sake.

FIG. 1 shows color patches prepared by the improved 100% UCR method.

In FIG. 1, the number (n) of discrete points of Y, M, C, and K is set to 5, and the maximum quantization level is set to 256 steps. In this case, each interval point is every 64 steps. When colors of combinations of the basic colors Y, M, C, and K at the five points (0, 64, 128, 192, and 255) are printed on a storage medium, for example, on a printing paper, the color patches of FIG. 1 is obtained.

Figure 2A:
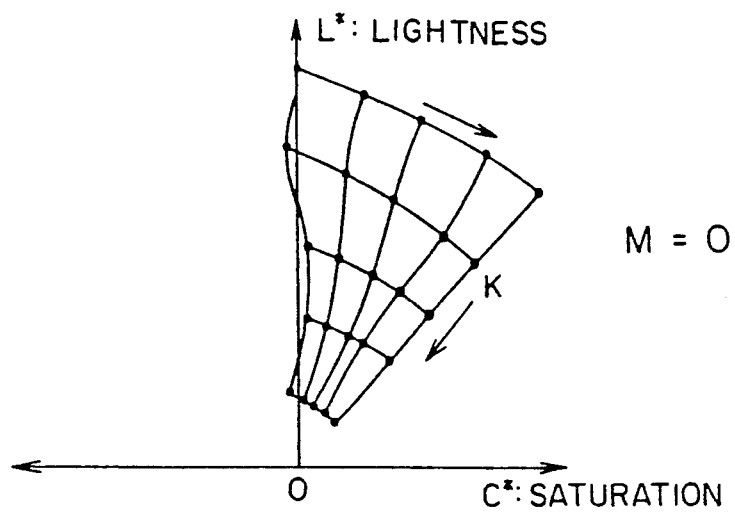
FIG. 2 shows maps of color values of color patches, which are mapped onto the L*u*v* color specification system.
Figure 2B:
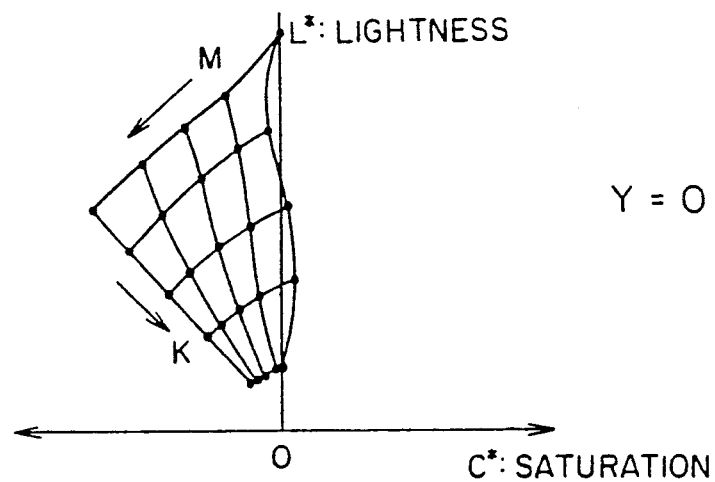
Figure 2C:
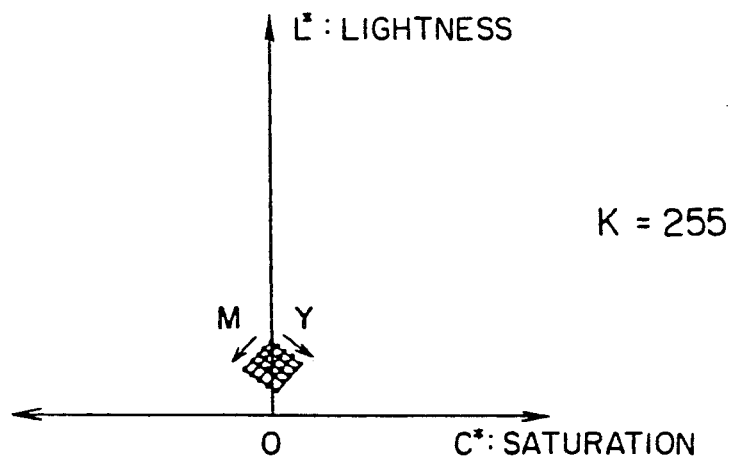

As the color patches of FIG. 1 are measured colorimetrically, and the measured color values (the provided color coordinates) are converted to values of another color specification system (for example, the L*u*v* color specification system) using the conversion expression into the system, and the converted values are plotted for each color patch, the maps of FIG. 2 are obtained. The color value of each color patch corresponds to an individual lattice point. In FIG. 2, two axes of saturation and lightness are used for color representation for convenience' sake, and the value of cyan C is omitted. The same may be said for the color specification systems indicated below.

Figure 3:
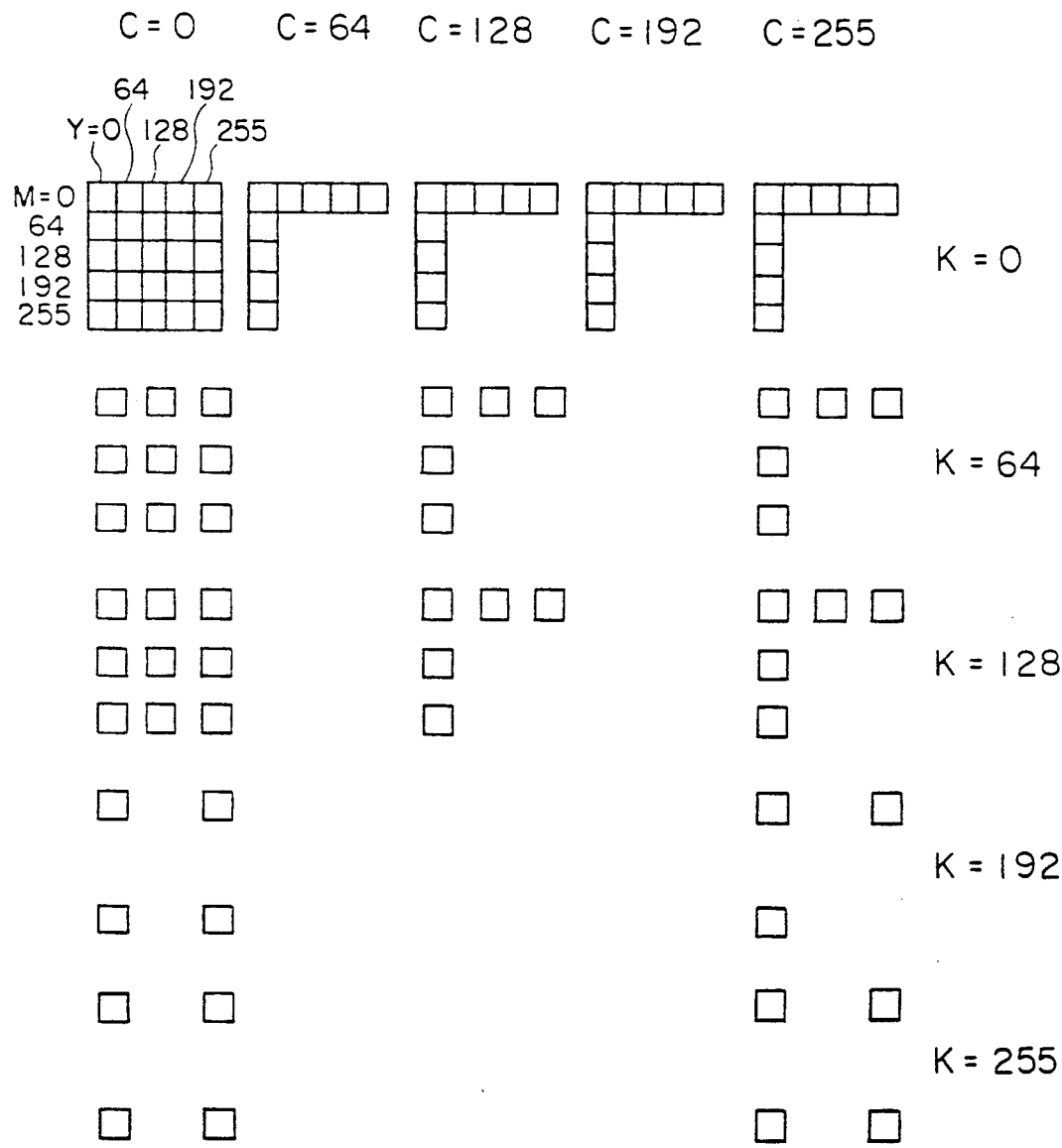
FIGS. 3 and 5 show color patches by the improved 100% UCR method related to the present invention.

Color patches satisfying Equation (1) indicated above can be shown as those of FIG. 3. FIG. 3 shows that the number of color patches is less than that of FIG. 1.

Figure 4A:
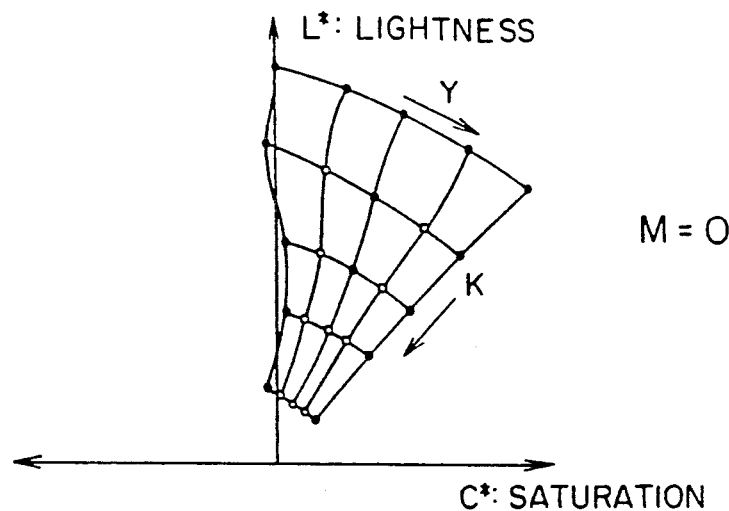
FIG. 4 shows maps of the color values of the color patches of FIGS. 3 and 5 onto the L*u*v* color specification system.
Figure 4B:
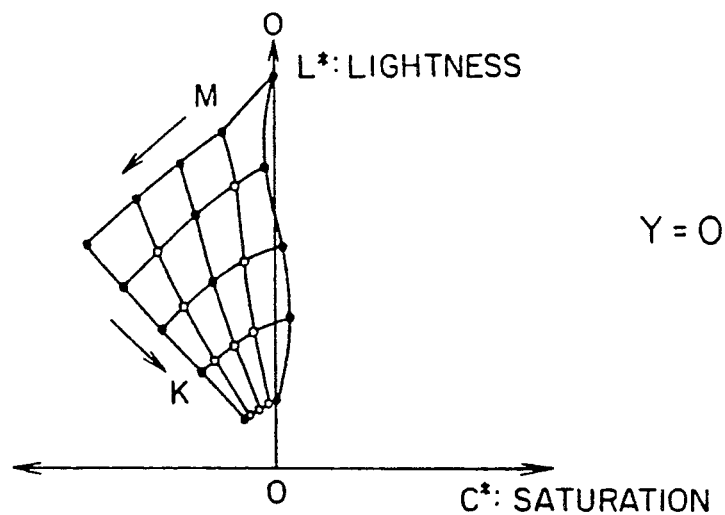
Figure 4C:
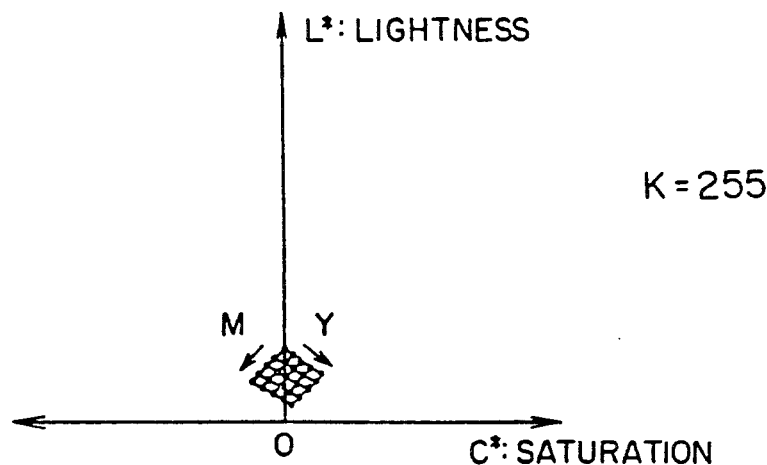

When the color patches of FIG. 3 are measured colorimetrically and mapped onto the L*u*v* color specification system, the maps of FIG. 4 are obtained. Each black circle indicates the measured color value.

In the color specification system of FIG. 4, as the value of K increases, the lattice interval decreases almost linearly. When the value of K is large, therefore, the data at each white circle lattice point can be determined by linear interpolation (for example, internal interpolation) on the basis of the data at closest lattice point with a minor error.

As the data at all the white circle lattice points are interpolated, the color specification system becomes the same as that of FIG. 3; the color patches of FIG. 2 becomes the same as those of FIG. 1.

Figure 5:
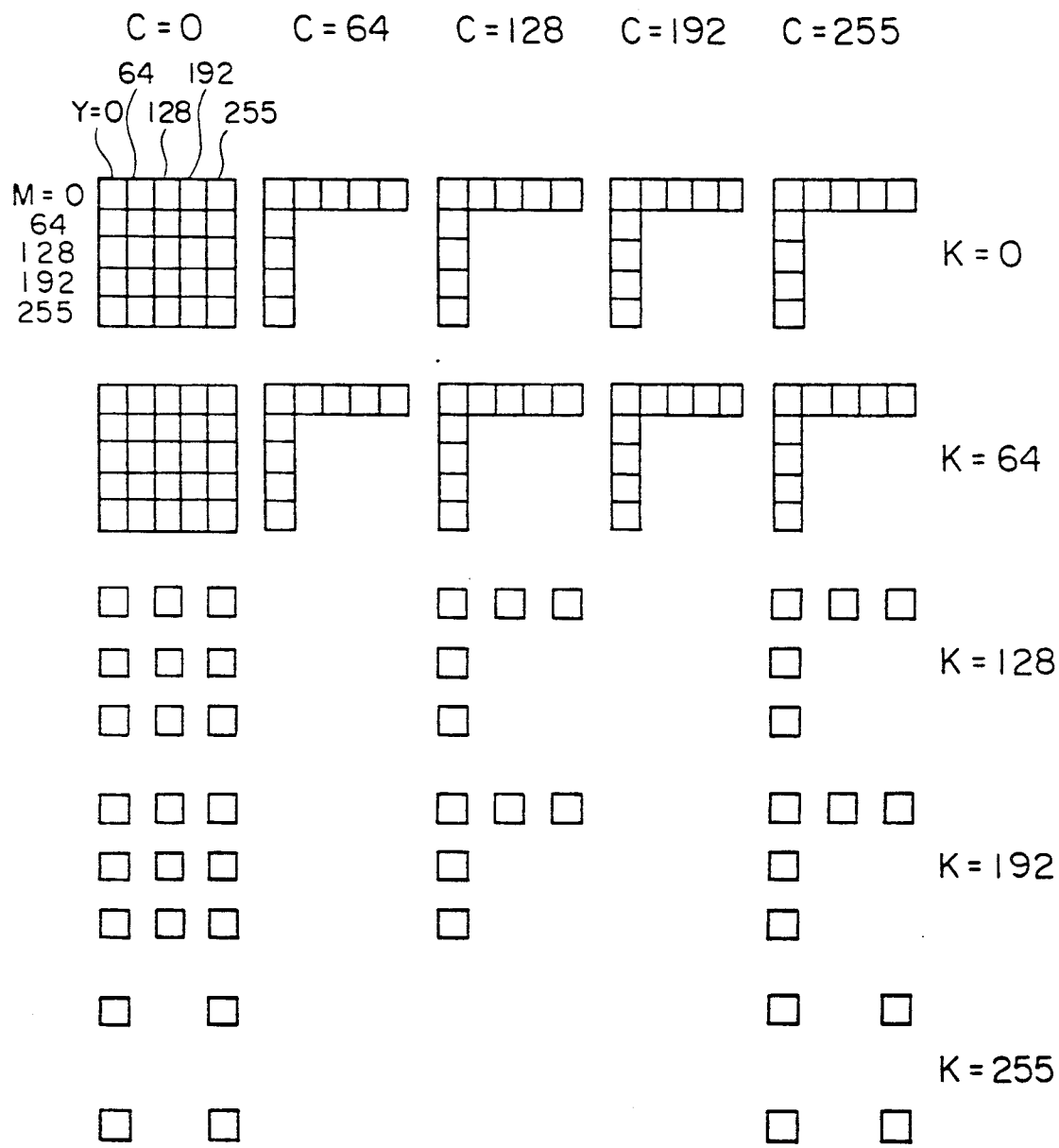

Even if the number of color patches is decreased, as far as it satisfies Equation (1), as the value of K increases according to the characteristics of the color values, color patches, which are the same as those of FIG. 1, can be obtained by interpolating and processing the data. Therefore, the number of color patches can be reduced. The configuration of color patches may be the same as that of FIG. 5.

Figure 6:
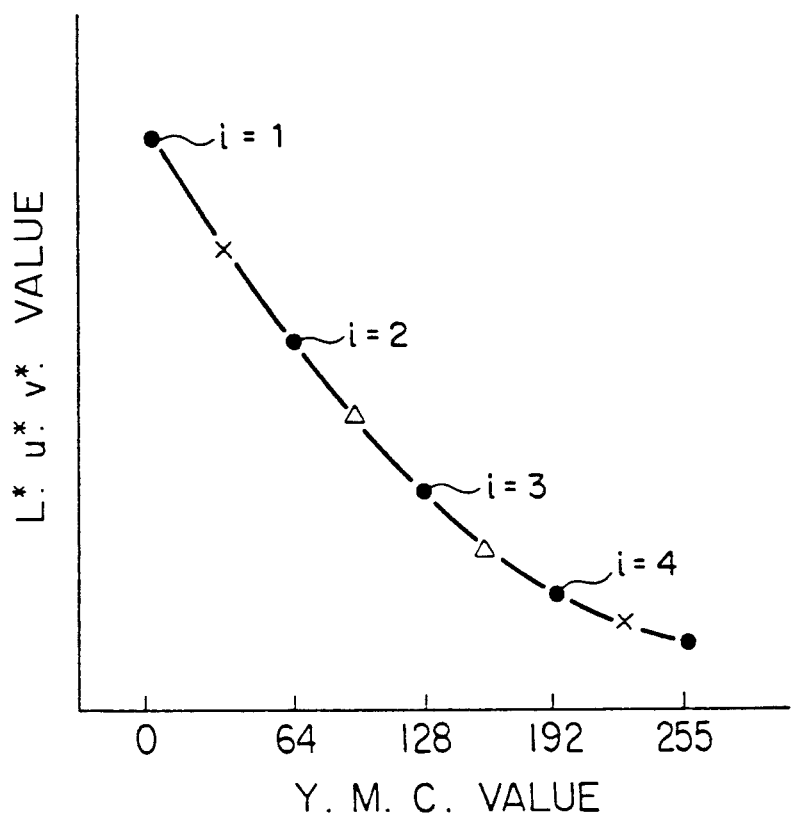
FIG. 6 is an illustration for curve approximation.

To reduce the lattice interval to a half of the above by electrical processing, it is desirable to interpolate and process the data on the basis of the mapped values. In this case, a non-linear interpolation is used. FIG. 6 shows an example of the non-linear interpolation.

Assuming that, as shown in FIG. 6, each black circle ● is a lattice point (sample point) and each Δ mark and x mark are the points to be interpolated, the interpolation expression, used for a Δ mark which is accompanied by not less than 2 black circles both before and behind, differs from the expression, used for a x mark which is accompanied by 1 black circle before and not less than 3 black circles behind.

Assuming that the color specification systems of the points to be interpolated are $L_m^*$, $u_m^*$, and $v_m^*$ and the color specification systems of the sample points are $Li^*$, $ui^*$, and $vi^*$ (i=1 to 4), the interpolation expressions used for the former are as follows:

$L_m^* = -(1/16)L1^* + (9/16)L2^* + (9/16)L3^* - (1/16)L4^*$ $u_m^* = -(1/16)u1^* + (9/16)u2^* + (9/16)u3^* - (1/16)u4^*$ $v_m^* = -(1/16)v1^* + (9/16)v2^* + (9/16)v3^* - (1/16)v4^*$

The interpolation expressions used for the latter are as follows:

$L_m^* = (5/16)L1^* + (15/16)L2^* - (5/16)L3^* - (1/16)L4^*$ $u_m^* = (5/16)u1^* + (15/16)u2^* - (5/16)u3^* - (1/16)u4^*$ $v_m^* = (5/16)v1^* + (15/16)v2^* - (5/16)v3^* - (1/16)v4^*$

Figure 7:
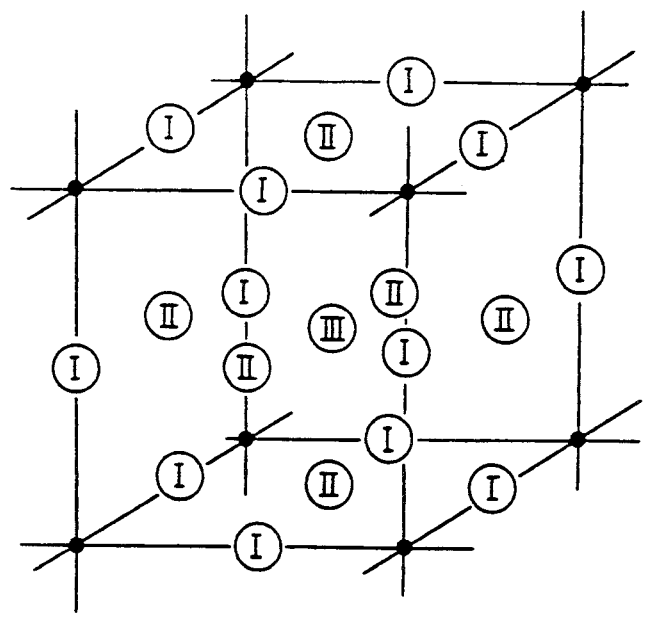
FIG. 7 is an illustration for expansion of the target value obtained in FIG. 6.

FIG. 7 shows an example of the interpolation sequence. The interpolation is performed in the order of the location Nos. I, II, and III.

By this interpolation, lattice points on the color specification system, as many as the color patches, which are larger in number than the actually measured color patches, can be obtained.

This interpolation can be substituted by an internal interpolation with linear approximate analysis.

By this method, color coordinates corresponding to color values can be obtained unless the number of color patches is increased. In this case, the color coordinates are the data at the lattice points.

Color coordinates existing at other than the lattice points can be calculated by a convergence interpolation as follows.

The point T1' (the target value) of the color coordinate system shown in FIG. 8, which is not any of the lattice points, corresponds to the target value T1 of the Y, M coordinate system shown in FIG. 9A, the point T2' to T2 of the M, K coordinate system shown in FIG. 9B, and the point T3' to T3 of the M, Y coordinate system shown in FIG. 9C.

For simplicity, the relationship of the target value with FIG. 9A is described below.

Figure 10:
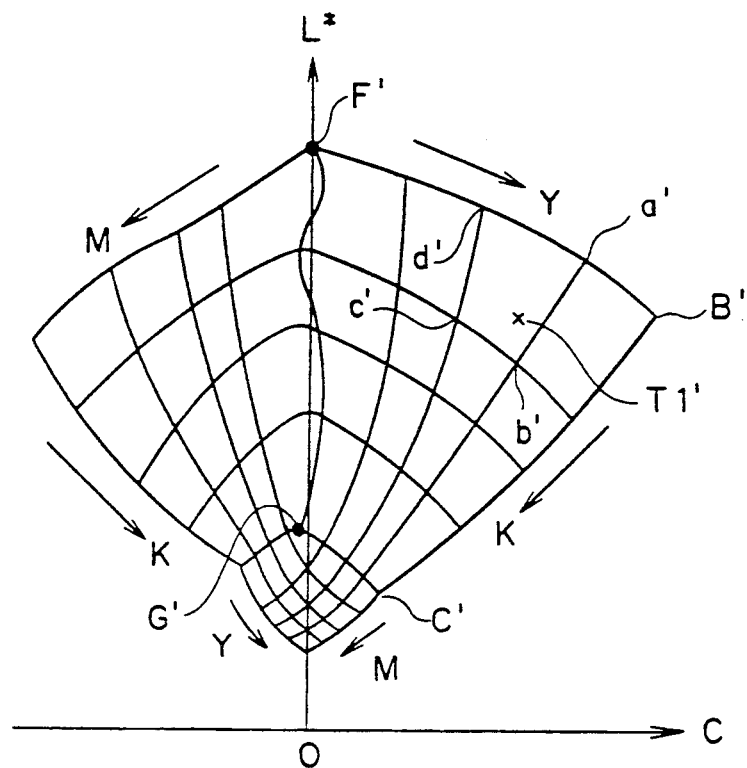
FIGS. 10 and 11 show the relationship the same as that of FIGS. 8 and 9, FIGS. 12 and 13 are illustrations for convergence operations.
Figure 11:
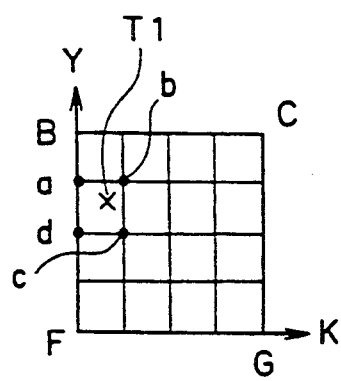

Since the target value T1' shown in FIG. 10 is in the area enclosed by the lattice points a', b', c', and d', the target value T1 can be inferred to be in the area, actually in a cubic (three-dimensional) space, enclosed by the square lattice points a, b, c, and d of the Y, K coordinate system shown in FIG. 11. Therefore, the area, where the target value exists, can be drawn by converging the area as well as seeing the correspondence between the color specification system of FIG. 10 and the coordinate system of FIG. 11.

Figure 12:
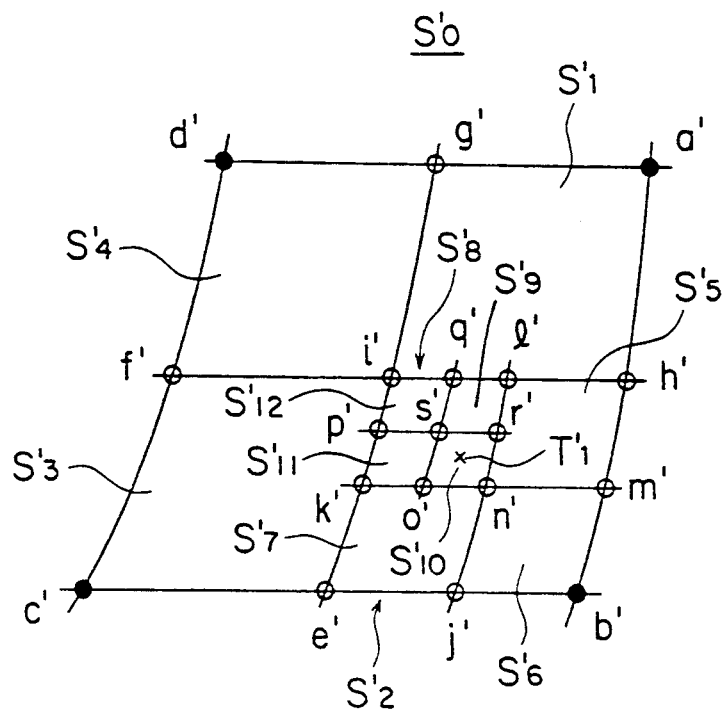
Figure 13:
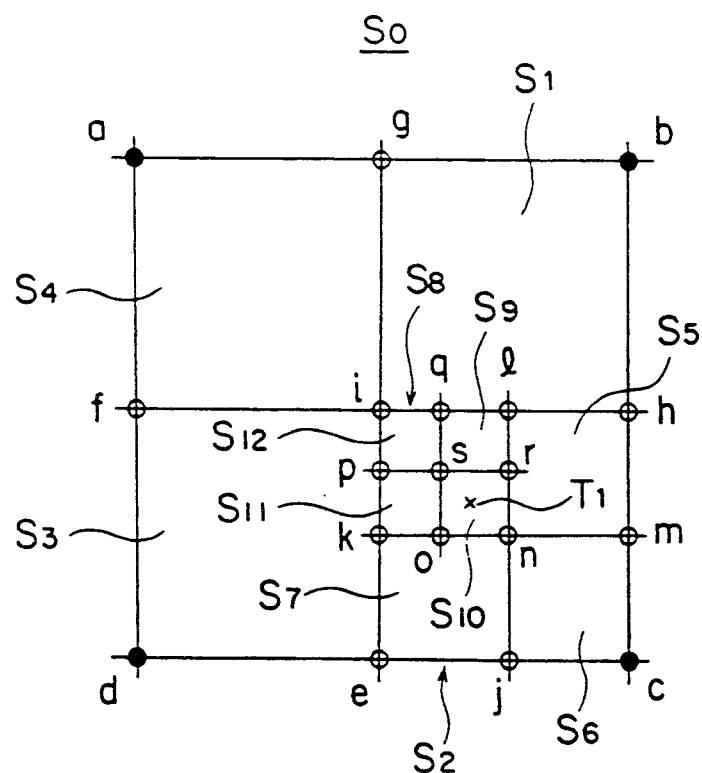

FIG. 12 is an expanded drawing of FIG. 10, and FIG. 13 is an expanded drawing of FIG. 11. Firstly, the area of FIG. 13, where the target value T1' exists, can be determined by checking the geometrical position relationship among the lattice points, which are vertexes of the areas, and the target value T1'.

Actually, the area can be selected by checking the coordinates of each vertex of the area by the judgment expression, described later. Assuming that the area is So', the target value T1 can be inferred to be in the area So of the coordinate system of FIG. 13 corresponding to the area So'.

Secondly, the inferred area is divided equally by 4. The five (in total) lattice points (division points) e, f, g, h, and i to be divided equally by 4 can be calculated by a weighted mean using the surrounding lattice points a, b, c, and d which are already determined. For example, two or four lattice points, surrounding the target value point, are provided by averaging them with respective weights.

The values corresponding to the lattice points e, f, g, h, and i which are newly calculated are plotted on the color specification system of FIG. 12 once again.

The area S2' including the target value T' can be determined from the four areas S1', S2', S3', and S4' which are divided by the plotted lattice points e', f', g', h', and i' using the method mentioned above, and the area S2 of FIG. 13 corresponding to the determined area S2' can be calculated by dividing the area So equally by 4.

By repeating division of the area, the lattice is narrowed step by step, resulting in convergence. By averaging the values of the four vertexes constituting the converged area (assuming that this area is S10' of FIG. 12 for convenience' sake), the target value T1 in the area S10 corresponding to the area S10' can be determined as a combination (actually a mixture amount of Y, M, C, and K) of the basic colors for reproducing the provided color coordinates (medium color).

Figure 14:
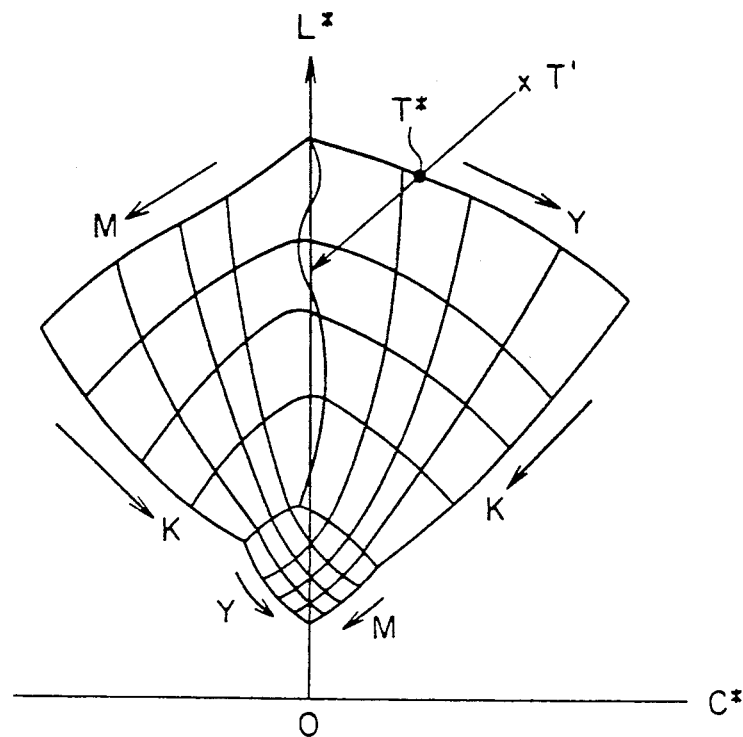
FIGS. 14 to 18 are illustrations for color coordinates which are beyond the color reproduction scopes.

When the target value T' of provided color coordinates is at the outside of the color coordinates shown in FIG. 14, the point (actually a surface) T* intersecting the color coordinates can be calculated.

When the color reproduction scope of the output system is narrower than the color reproduction scope of the input system, the target value T' exists outside the cubic space.

Figure 17:
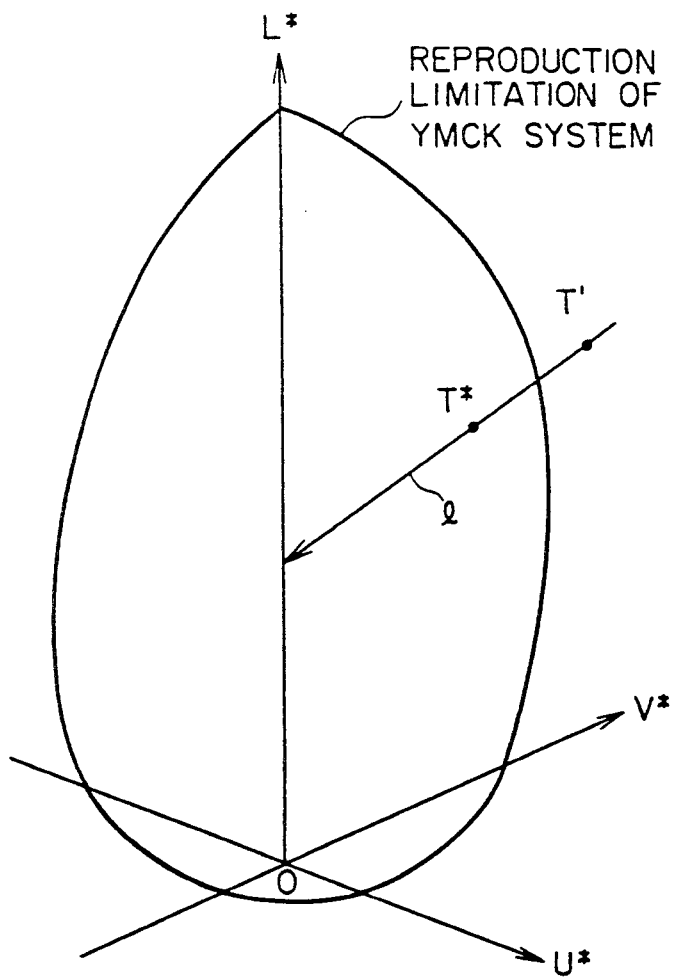

In this case, by moving the target value T' toward the achromatic color unless the color is changed as shown in FIG. 17, the color at the intersection point of the straight line l in the achromatic color direction and the boundary of the color reproduction scope can be used as a target value T*.

Figure 15:
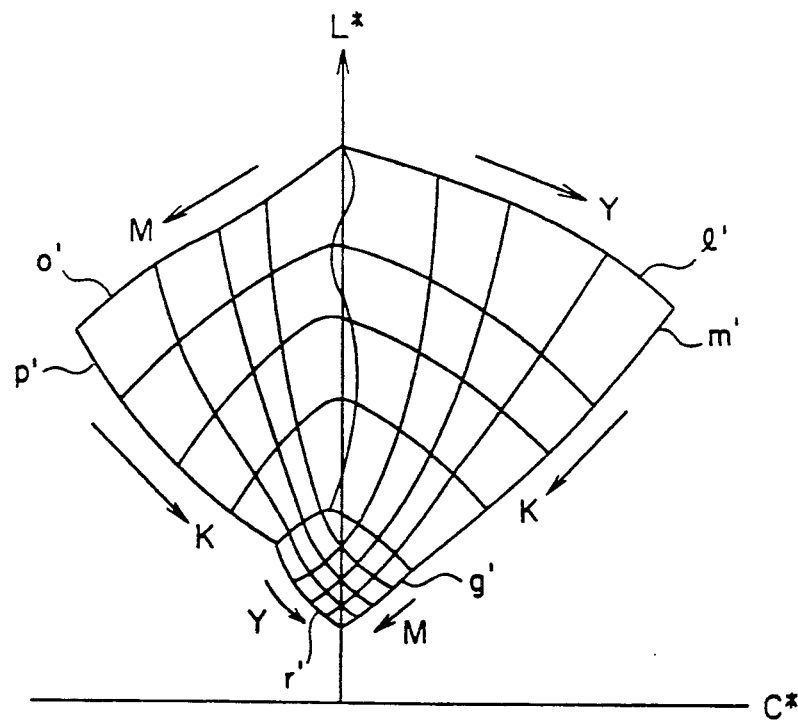
Figures 16A, 16B, 16C:
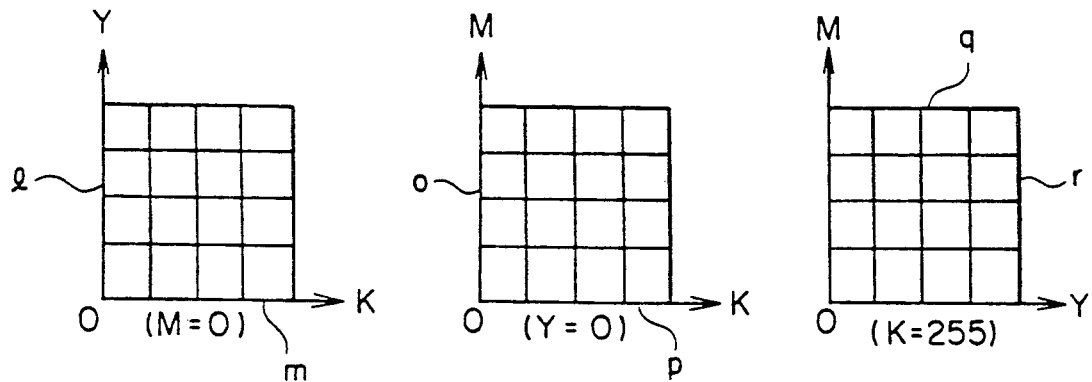

Determining the intersection point T* is nothing else but searching for the peripheral surface l', m', o', p', q', and r' of the color coordinate system as shown in FIG. 15 or searching for the intersection points of the axes l, m, o, p, q, and r of the Y, M, and C coordinate system of FIG. 16.

The surface which the target value T' of FIG. 14 intersects is one of the 12 surfaces under the conditions indicated below.

1. Y=0 and K=0.
2. M=0 and K=0.
3. C=0 and K=0.
4. Y=0 and M is the maximum value.
5. Y is the maximum value and M=0.
6. M=0 and C is the maximum value.
7. M is the maximum value and C=0.
8. C=0 and Y is the maximum value.
9. C is the maximum value and Y=0.
10. Y is the maximum value and K is the maximum value.
11. M is the maximum value and K is the maximum value.
12. C is the maximum value and K is the maximum value.

Figure 18:
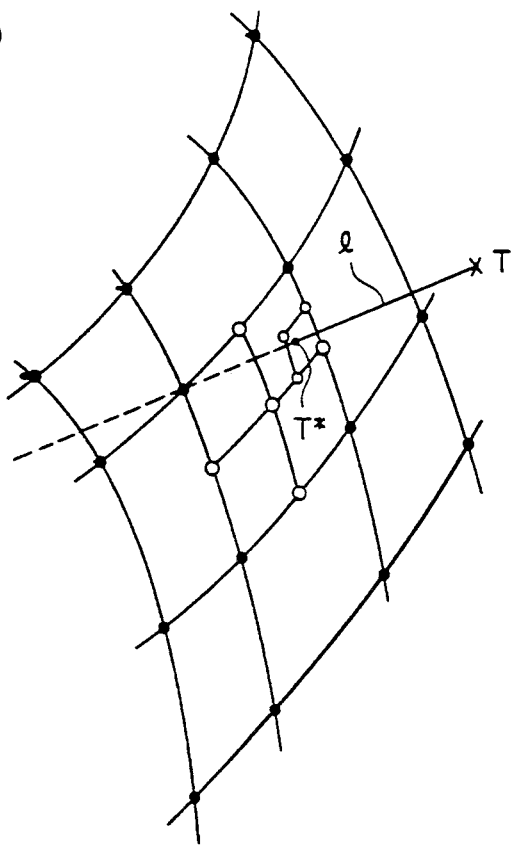

When the intersection surface is determined, the area enclosed by the white circles is converged by operations from the area enclosed by the lattice points (by the black circles) as shown in FIG. 18, and the target value T* can be calculated.

From the above, a combination of Y, M, C, and K can be determined under each of the two conditions indicated below.

I. The provided color coordinates are in the colors solid.
II. The provided color coordinates are not in the color solid.

Figure 19:
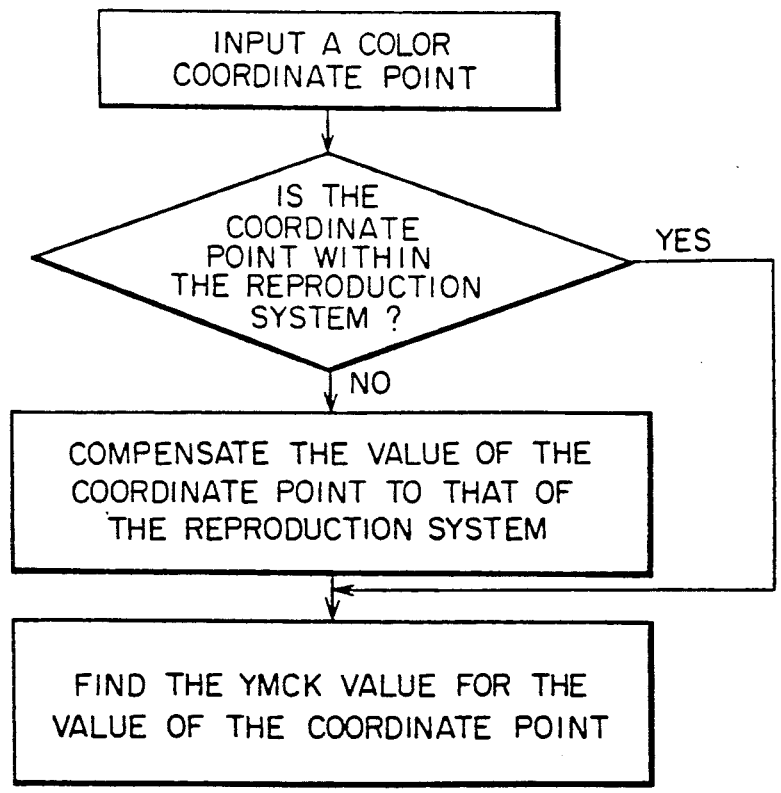
FIG. 19 is a flow chart indicating the algorithm for obtaining a combination of Y, M, C, and K indicating the color of color coordinates provided.

The flow of color reproduction characteristics estimation algorithm is as shown in FIG. 19.

When the value of each Y, M, C, and K in the above description is 0, it indicates the minimum density. However, when the value is the maximum value (255 in the above example), it does not always indicate the maximum density. For example, the settings in Table 1 are available.

TABLE 1

| Value of YMCK | Printing | Thermal dye transfer | Electro-photography |
|---|---|---|---|
| 0 | About 3% | 0.05 | 0 |
| 255 | About 98% | Maximum density | 256 |

TABLE 1-continued

| Value of YMCK (8 bits) | Printing (Dot percent) | Thermal dye transfer (Density) | Electro-photography (Dither pattern) |
|---|---|---|---|

In the description of the electrophotography method, 0 indicates a non-toner loading state and 256 indicates a perfect toner loading state.

The settings in Table 1 prevents instability or jumping near the highlight or shadow.

Descriptions of the first example of the color masking device (a color resolution image correction device) suited for applying the color reproduction characteristics estimation method using color patches related to the present invention.

The target value (a combination of Y, M, C, and K or color correction data) calculated as mentioned above is stored in the main look-up table (MLUT) beforehand. When the input system in a color CRT, color coordinates of the Y, M, C, and K coordinate system corresponding to the basic color coordinate system determined by B, G, and R are provided.

Figure 20:
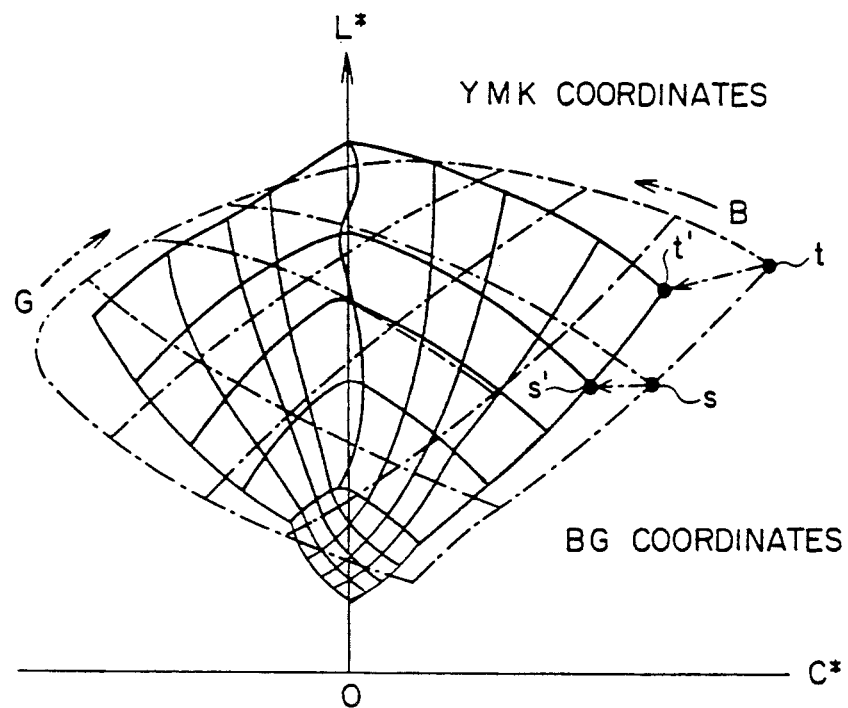
FIG. 20 shows the relationship between the B and G coordinate system and the Y, M, and K coordinate system.

The color coordinates can be determined by an operation. Since the relationship between the R, G, and B coordinate system, for example, the B and G coordinate system and the Y, M, and K coordinate system is as shown in FIG. 20, processing such that, the point t corresponds to t' and the point s corresponds to s' are respectively performed on the input coordinate system. To allow the R, G, and B coordinate system to correspond to the Y, M, C, and K coordinate system, a main look-up table (MLUT) is provided. When a coordinate system indicating the point t is inputted, for example, the coordinate system indicating t' is referred to.

Color correction data at other than the lattice points can be calculated by interpolation.

In the improved 100% UCR method as mentioned above, YMCK data is determined beforehand under one of the four conditions indicated below according to the data of the input coordinate system.

(a) Y, M, K (C=0)

(b) Y, C, K (M=0)

(c) M, C, K (Y=0)

(d) Y, M, C (K is the maximum density; solid print)   (2)

For simplicity, (a) will be described.

Figure 21:
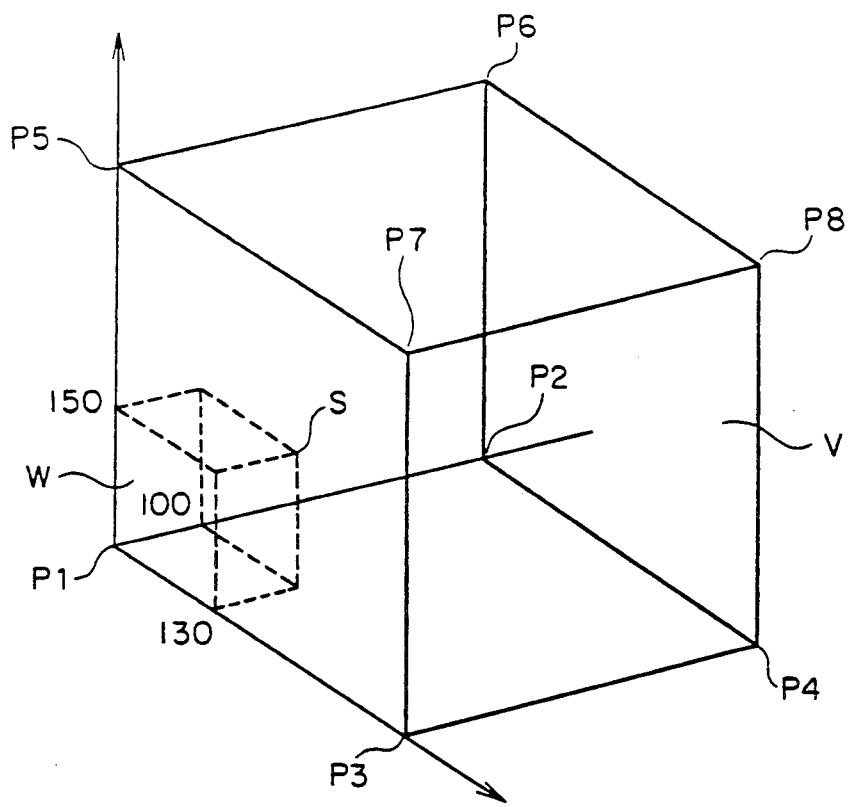
FIG. 21 is an illustration for interpolation.

In this example, a cuboid space V, which is formed by 8 color correction data (known calculation color correction data P1, P2, P3, P4, P5, P6, P7, and P8 corresponding to Y, M, C (=0) and K) including a cuboid space W (the interpolation point S is located at the diagonal vertex) determined by the three input image data R, G, and B as shown in FIG. 21, is determined. P1 is a reference point for both cuboid spaces W and V. It is assumed that for the combined color at each of the points 0, 32, 64, 96, 128, 160, 192, 224, and 255, the color correction value mentioned above is provided. When the input image data R, G, and B are 100, 130, and 150, the data is interpolated using the color correction data at the vertexes (lattice points) of the cubic space enclosed by the 8 points indicated below.

Pi (i = 1 to 8) on the left side indicates the coordinates of the corresponding vertex, and the right side indicates the color correction data Ki, Ci, Mi, and Yi.

P1: (96, 0, 128, 128) = (K1, C1, M1, Y1)
P2: (128, 0, 128, 128) = (K2, C2, M2, Y2)
P3: (96, 0, 160, 128) = (K3, C3, M3, Y3)
P4: (128, 0, 160, 128) = (K4, C4, M4, Y4)
P5: (96, 0, 128, 160) = (K5, C5, M5, Y5)
P6: (128, 0, 128, 160) = (K6, C6, M6, Y6)
P7: (96, 0, 160, 160) = (K7, C7, M7, Y7)
P8: (128, 0, 160, 160) = (K8, C8, M8, Y8)

The weight factor for each vertex Pi of the cubic space V can be calculated as follows:

In this example, the volume of the cuboid space W, formed by the opposite vertex of the correction value point to be determined and by the interpolation point S is assumed as a weight factor Wi at the point of the correction value to be determined.

The distance between P1 and S can be calculated as follows using the coordinates of P1 and S:

(100, 130, 150) − (96, 128, 128) = (4, 2, 22)

Therefore, the volume of cuboid space formed by S and P1 is as follows:

ti $4 \times 2 \times 22 = 176$

This is the weight factor at the point P8.

The weight factors at the other points P1 to P7 calculated in the same way are as follows:

| P1 = 8400 | P2 = 1200 |
|---|---|
| P3 = 560 | P4 = 80 |
| P5 = 18480 | P6 = 2640 |
| P7 = 1232 | P8 = 176 |

The sum of these weight factors is equal to the volume of the cubic space V, which is 32768 (in the case of a) in this example. Therefore, the correction values Ks, Cs, Ms, and Ys at the point S are as follows:

$Ks = 1/a(P1K1 + P2K2 + P3K3 + P4K4 + P5K5 + P6K6 + P7K7 + P8K8)$ $Cs = 1/a(P1C1 + P2C2 + P3C3 + P4C4 + P5C5 + P6C6 + P7C7 + P8C8) = 0$ $Ms = 1/a(P1M1 + P2M2 + P3M3 + P4M4 + P5M5 + P6M6 + P7M7 + P8M8)$ $Ys = 1/a(P1Y1 + P2Y2 + P3Y3 + P4Y4 + P5Y5 + P6Y6 + P7Y7 + P8Y8)$

Assuming that a point to be determined is S and the correction values at the 8 points enclosing said point are Ki, Ci, Mi, and Yi (these are values of the Y, M, C, and K coordinate systems corresponding to the interpolation values Ls*, us*, and vs* of the color specification system), and the individual weight factors are Ai:

$$Ks = \left(1 / \sum_{i=1}^{8} Ai\right) \sum_{i=1}^{8} AiKi$$

$$Cs = \left(1 / \sum_{i=1}^{8} Ai\right) \sum_{i=1}^{8} AiCi$$

$$Ms = \left(1 / \sum_{i=1}^{8} Ai\right) \sum_{i=1}^{8} AiMi$$

$$Ys = \left(1 / \sum_{i=1}^{8} Ai\right) \sum_{i=1}^{8} AiYi$$

When the data of the input coordinate systems R, G, and B are different from each other, the weight factor Ai calculated from the data in correspondence with the input data is used for interpolation.

This input data contains values, which agree with Condition Expression (2), hence there is no need to change the input data according to Condition Expression (2).

It is desirable to set the number of color correction data to 2 to the "n"th power in consideration of the capacity of a ROM. When a 256K-bit ROM is used, for example, color correction data at 32 points ($32^3 = 32768$ points for all the three colors) can be set for each color.

Figure 22:
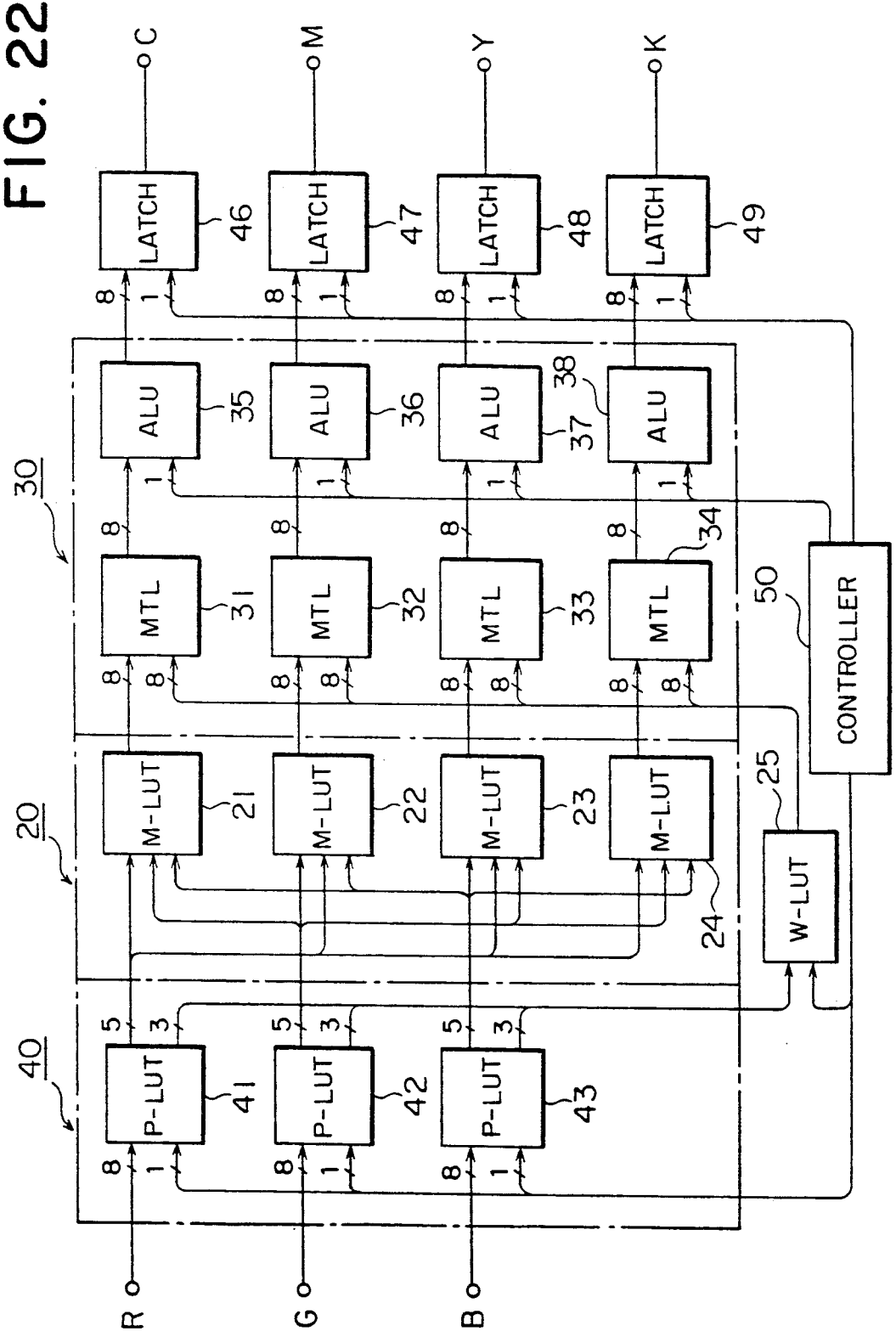
FIG. 22 is a schematic diagram for the first embodiment of a color masking device which the present invention can be applied to, FIG. 23 shows the relationship between addresses and color compensation data used in FIG. 22.
Figure 25:
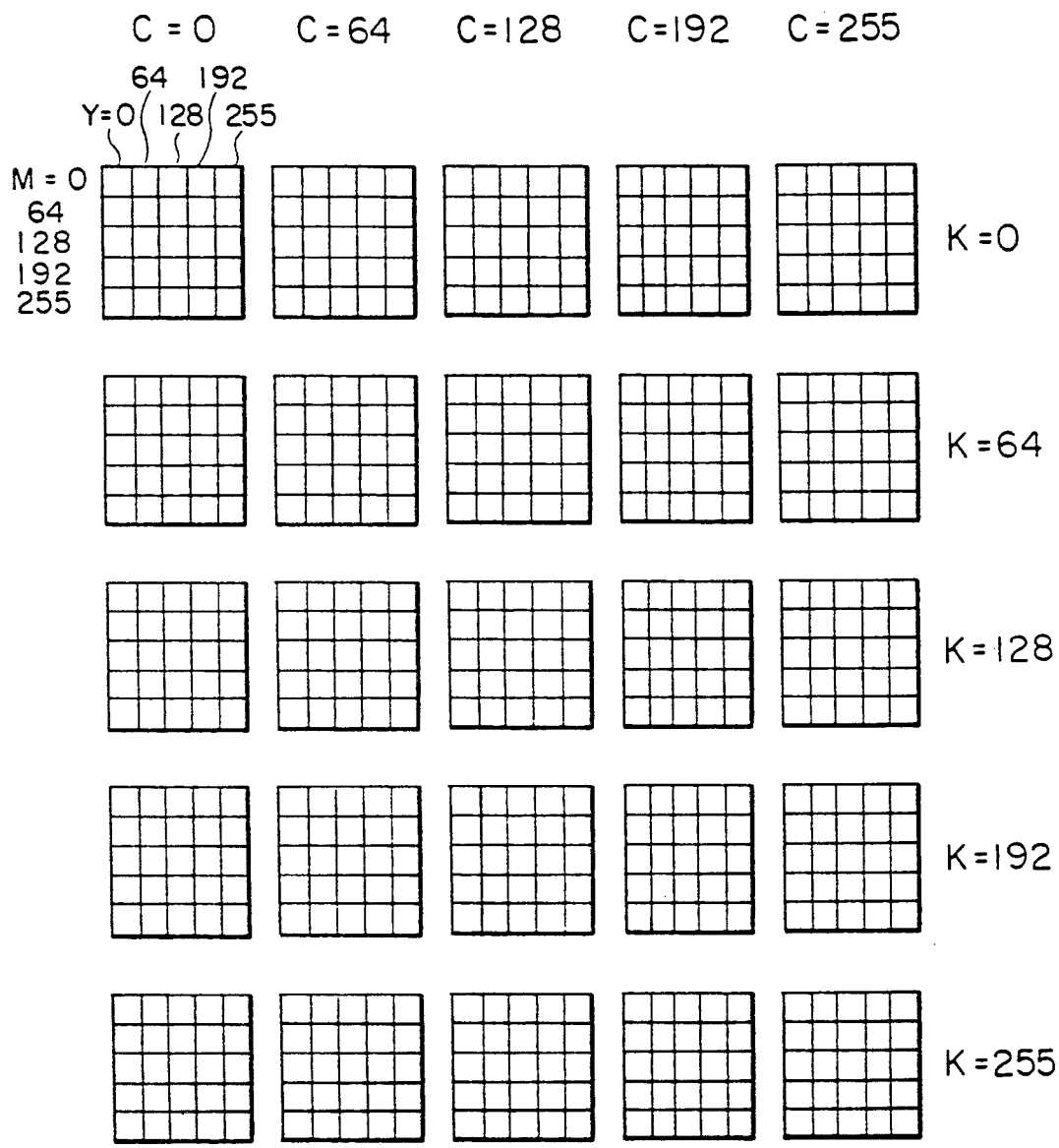
FIG. 25 is an illustration for Y, M, C, and K color patches.
Figure 26:
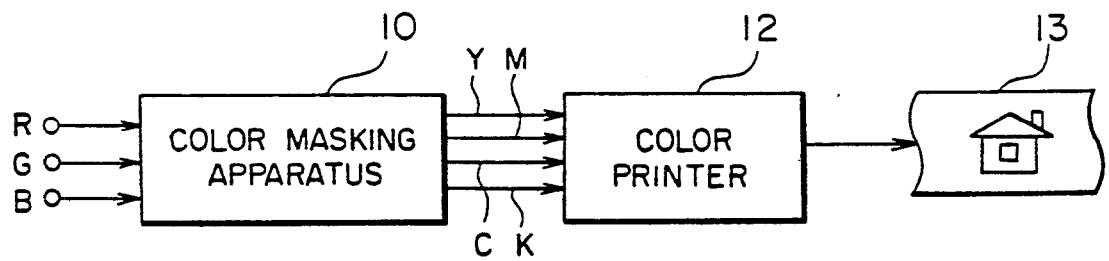
FIG. 26 is a schematic diagram of a color image forming device to be used for description of the present invention.

FIG. 22 shows an example of the color masking device 10.

Color correction data for the colors Y, M, C, and K are stored respectively in the MLUTs 21, 22, 23, and 24 of the color correction data storage means 20. Reference numeral 25 designates a weight factor storage means, which is also a look-up table (LUT).

Input image data B, G, and R are supplied to an address signal generation means 40, and an address signal of the upper five bits corresponding to the input level is outputted and supplied to the color correction data storage means 20. A weight factor specification signal of the lower three bits, which is outputted from the address signal generation means 40, is supplied to the weight factor storage means 25.

When the color coordinates determined by the input image data R, G, and B do not coincide with any of the lattice points of FIG. 20, a 5-bit address signal is referred to and outputted by the input image data R, G, and B so that four lattice points of the Y, M, C, and K coordinate system enclosing the color coordinates can be specified by the color correction data storage means 20.

The address signal generation means 40 also comprises look-up tables (PLUT) 41, 42, and 43. Bipolar ROMs are suited for look-up tables. A 1-bit distribution signal is supplied from a controller 50 to the PLUTs 41, 42, and 43. The details will be described later.

The color correction data, which is referred by the address signal corresponding to the input level of the input image data, and the data indicating the weight factor (hereinafter called just the weight factor) are supplied to a multiplication and accumulation means 30 sequentially 8 times.

The multiplication and accumulation means 30, as mentioned above, executes AiBi (Bi is a generic name for Y, M, C, and K) sequentially and determines the sum of the results. In this example, the multiplication and accumulation means 30 comprises multipliers 31, 32, 33, and 34 and accumulators 35, 36, 37, and 38.

A 512K-bit ROM is used for each of the multipliers 31, 32, 33, and 34, to which the corresponding color correction data (8 bits in length) and the weight factor Ai are supplied. Multiplication of AiBi is executed, and the multiplication output of the upper eight bits is supplied to the accumulators (ALU) 35, 36, 37, and 38 to be added sequentially.

The accumulators 35, 36, 37, and 38 are operated with the accuracy of 16 bits, and the upper eight bits are used as accumulation output (multiplication and addition output). This results in output which is the same as the result of the accumulation output divided by the weight factor Ai.

The accumulation output of the upper eight bits is latched by latch circuits 46, 47, 48, and 49. A latch pulse is generated by the controller 50. The configuration of each unit will be described more in detail.

When 256K-bit ROMs are used for LUTs 21, 22, 23, and 24 to be used as color correction data storage means 20, 32 points are extracted between the minimum level and the maximum level of input image data. Therefore, color correction data at 32 points ($32^3 = 32768$ points for 3 colors) can be stored for each color. When the input levels of 256 gradations are provided, for example, 32 points can be obtained by delimiting all the points every 8 points starting at 0 as follows:

0, 8, 16,—, 240, 248

The 33rd point, which is between 249 and 255, is not used; or the point between 249 and 255 is handled as 248.

Color correction data at such distribution points are accurately calculated and a plurality of calculated color correction data are stored in LUTs 21, 22, 23, and 24.

Since 8-bit general-purpose ROMs can be used when 32 distribution points are set as mentioned above, there is an advantage that inexpensive storage means 20 can be structured with those ROMs.

The weight factor Ai at each distribution point is stored in the LUT 25 for the weight factor storage means. When every 8 bits are distributed as mentioned above, the total of the 8 times of operations for weight factor Ai is:

$$8 \times 8 \times 8 = 512$$

When commercial 8-bit general-purpose ICs are used as mentioned above, the number of elements is increased when the weight factor is a theoretical value (the maximum value is 512). In this example, an approximate value which is reduced to about ½ of the theoretical value is used as an actual weight factor.

In the example indicated below, the sum of 8 weight factors is set to 256, and the maximum weight factor to 255.

Assuming that the interpolation point S is at the position of the point P1 in FIG. 21, for example, the weight factor at each point of P1, P2, P3, P4, P5, P6, P7, and P8 is as follows (the value in parentheses indicates theoretical values):

P1, P2, P3, P4, P5, P6, P7, P8
255, 0, 0, 0, 0, 0, 0, 1
(512, 0, 0, 0, 0, 0, 0, 0)

The sum of the weight factors is 256.

When S is located between P1 and P3 or at a distance of 3 from P1 (5 from P3), the weight factor at each of P1, P2, P3, P4, P5, P6, P7, and P8 is as follows:

P1, P2, P3, P4, P5, P6, P7, P8
160, 0, 96, 0, 0, 0, 0, 0
(320, 0, 192, 0, 0, 0, 0, 0)

Each weight factor can be selected properly so that the sum of the weight factors is also 256.

When S is at a distance of 3 from the plane of P1, P2, P3, and P4, at a distance of 1 from the plane of P1, P3, P5, and P7, and at a distance of 5 from the plane of P1, P2, P5, and P6, the weight factor of each of P1, P2, P3, P4, P5, P6, P7, and P8 is as follows:

P1, P2, P3, P4, P5, P6, P7, P8
53, 7, 88, 12, 32, 4, 53, 7
(105, 15, 175, 25, 63, 9, 105, 15)

Each weight factor can be selected properly so that the sum of the weight factors is also 256.

The 1-bit distribution signal mentioned above is a control signal to specify the color correction data at the point S and before and behind said point.

For convenience' sake of description, the relationship between the 32 distribution points (lattice points) and the corresponding address signals is set as shown in FIG. 23.

When the input image data level is 100, address signals (12, and 13) to allow the color correction data storage means 20 to output color correction data (96 and 104) at the input level and before and behind said level are required to be generated.

When the distribution signal is 0, an address signal (12) to allow the color correction data (96) at the small number to be referred to is outputted. When the distribution signal is 1, an address signal (13) to allow the color correction data (104) at the large number to be referred to is controlled to be outputted.

When the maximum value (248 in this case) is used and the distribution signal is 0, the color correction data at the number is selected. When the distribution signal is 1, the color correction data at the small number (240 in this case) is selected.

The distribution signal is also supplied to the weight factor storage means 25.

In the present invention, provided color coordinates depend on an input unit. When the input unit is a display, as mentioned above, the color coordinates can be determined by operating the values of R, G, and B. When the input unit is a printing system, the color coordinates can be determined by operating the values of the four colors Y, M, C, and K.

When the input unit is a scanner, the color coordinates can be determined from the values of R, G, and B.

As described above, in the color reproduction characteristics estimation method of the present invention to estimate a combination of yellow Y, Magenta M, cyan C, and black K indicating the color coordinates specified:

the combination of Y, M, C, and K of combinations of Y, M, C, and K indicating the provided color coordinates, in which the value of K is the maximum density, is determined at each specific point of the discretely provided color coordinates, color patches of Y, M, C, and K of those discrete combinations are prepared, and the density values of Y, M, C, and K corresponding to color coordinates at other than the specific points are estimated from the colorimetrized values of the prepared color patches.

By this method, degradation of the color reproduction characteristics, which is a disadvantage of the 100% UCR method, can be prevented, and the effects indicated below can be produced.

Ink and toner can be economized.

The gray balance can be stabilized.

The color reproduction scope can be used at its maximum.

The ink head, thermal head, and laser and photosensitive drums can be used longer due to ink conservation.

When characters are recorded, pseudo-colors at character edges due to the Dither method are reduced, and misalignment of color superposition prints is inconspicuous.

Since the number of color patches to be colorimetrized for calculating combinations of Y, M, C, and K using color patches is decreased, the colorimetrizing time can be shortened.

Therefore, the present invention is extremely suited for recording color image information in four colors of Y, M, C, and K using the general printing method, the ink jet method, or the heat-sensitive transfer method.

Descriptions of the second embodiment of a correction device of the present invention with reference to the drawings follow.

In this embodiment, a divided space with the minimum number of vertexes, that is, a triangular pyramid, which is obtained by dividing the basic lattices furthermore, is used for the interpolation mentioned above. Therefore, the operation time can be shortened in addition to the effects of the previous embodiment.

Figure 27:
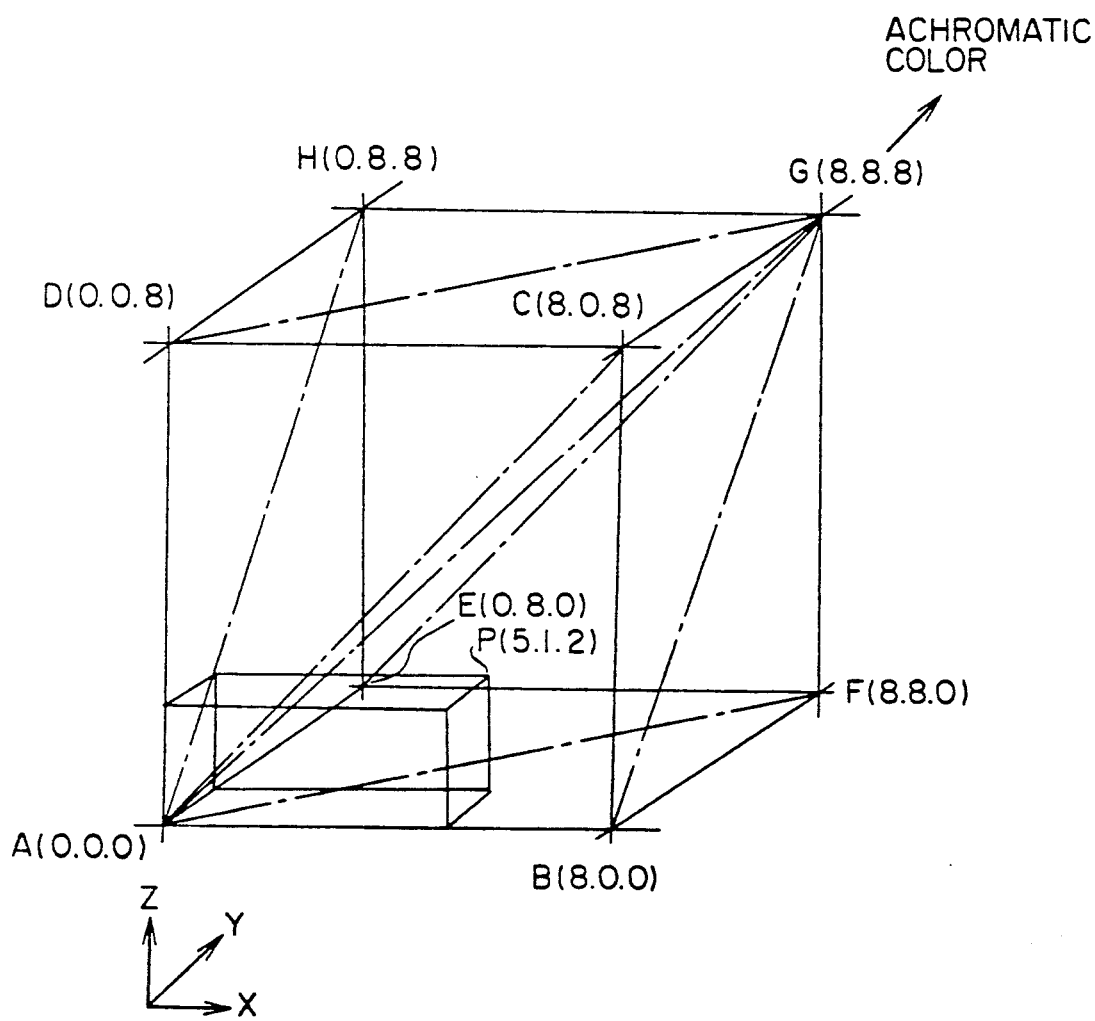
FIGS. 27 to 29 are illustrations for the second embodiment of the present invention.

As shown in FIG. 27, six triangular pyramids can be formed by alternate long and short dash lines from the basic lattice comprising the vertexes A, B, C, D, E, F, G, and, H. In this case, each triangular pyramid is formed to contain a dividing line (see the alternate long and short dash line crossing A and G) in parallel with the achromatic color axis.

Since the interpolation point P exists within the basic lattice, the triangular pyramid containing P can be determined.

Figure 28B:
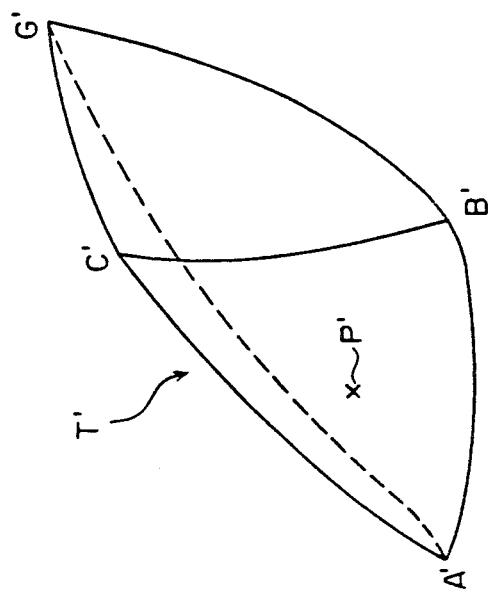
Figure 28A:
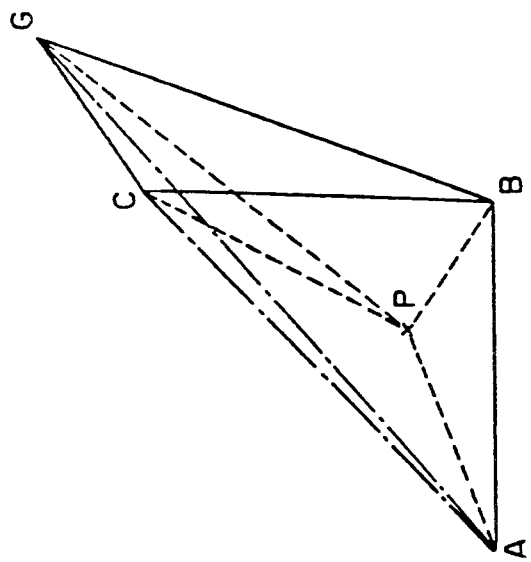

Assuming that, for example, the coordinates of the vertexes A, B, C, D, E, F, G, and H are as shown in the figure and the coordinates of the interpolation point P are P(5, 1, 2), FIG. 28A shows that the interpolation point P is contained in the triangular pyramid T formed by the vertexes A, B, C, and G. FIG. 28B shows a color specification system related to the triangular pyramid T. Assuming that the vertexes A', B', C', D', E', F', and G' correspond to the vertexes A, B, C, D, E, F, and G respectively, the interpolation point P' exists within the triangular pyramid T'.

When the triangular pyramid T is determined, the interpolation point P can be connected, as shown in FIG. 28A, to the vertexes A, B, C, and G to form new four triangular pyramids. The volumes of the triangular pyramids V BCGP, V ACGP, V ABGP, and V ABCP can be determined. From the volumes V BCGP, V ACGP, V ABGP, and V ABCP and the vertexes A', B', C', and G' of the color specification system of FIG. 28B, the interpolation point P' can be calculated from the equation indicated below. V ABCG indicates the volume of the triangular pyramid T.

P' = 1/V ABCG (V BCGP.A' + V ACGP B' + V ABGP.C' + V ABCP.G')

When the coordinates of the interpolation point P are changed, the triangular pyramid T to be used is changed. When the coordinates of the interpolation point P are P (3, 1, 5), the interpolation point P is contained in the triangular pyramid T formed by the vertexes A, C, D, and G shown in FIG. 29, and this triangular pyramid T can be used.

By performing the interpolation using the triangular pyramids in this way, the interpolation point P' can be calculated by 4 times of multiplication and accumulation.

Figure 30:
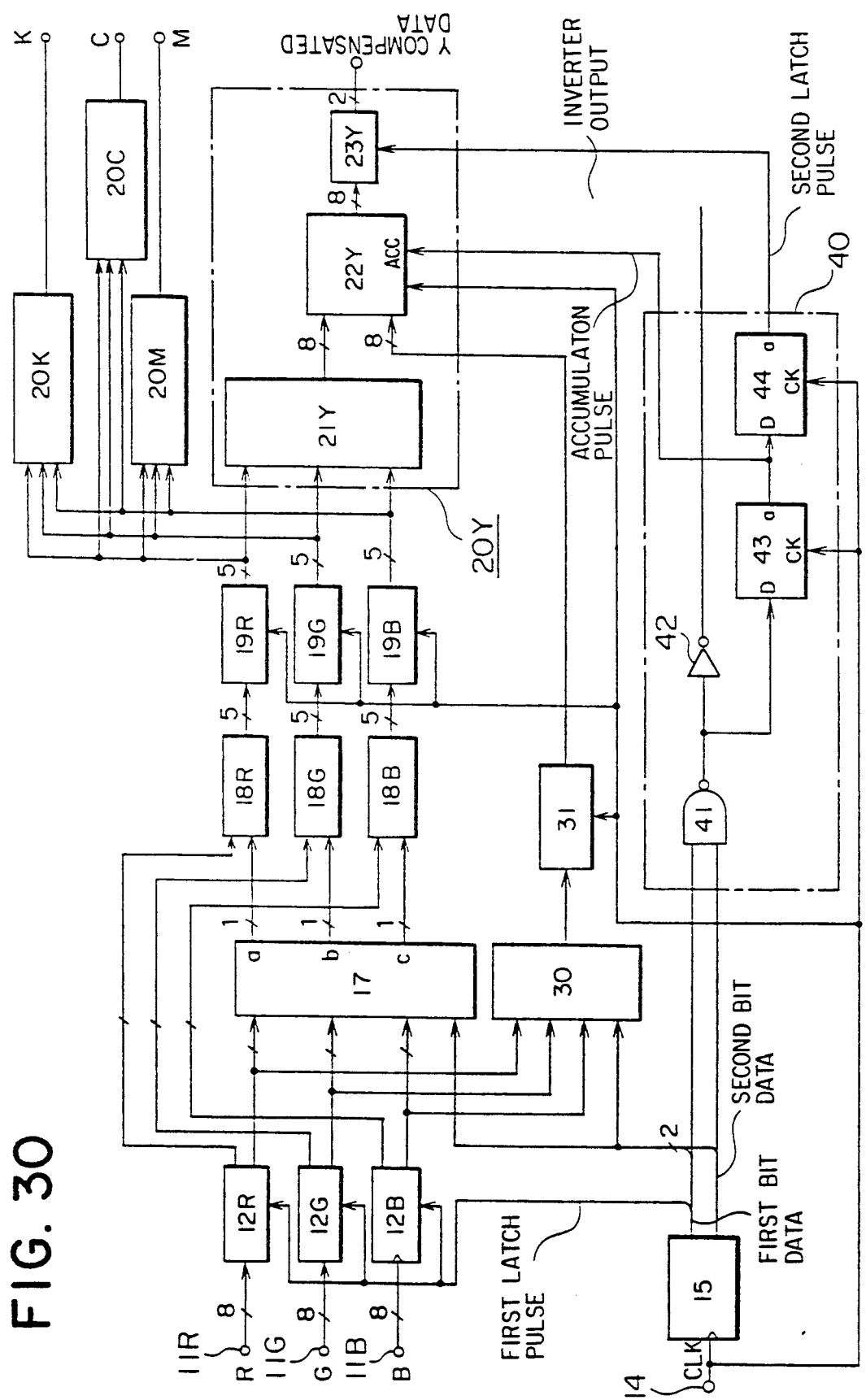
FIG. 30 is a block diagram indicating the second embodiment of the present invention.

FIG. 30 shows an example of a color masking device 10 which performs such interpolation.

Figure 31:
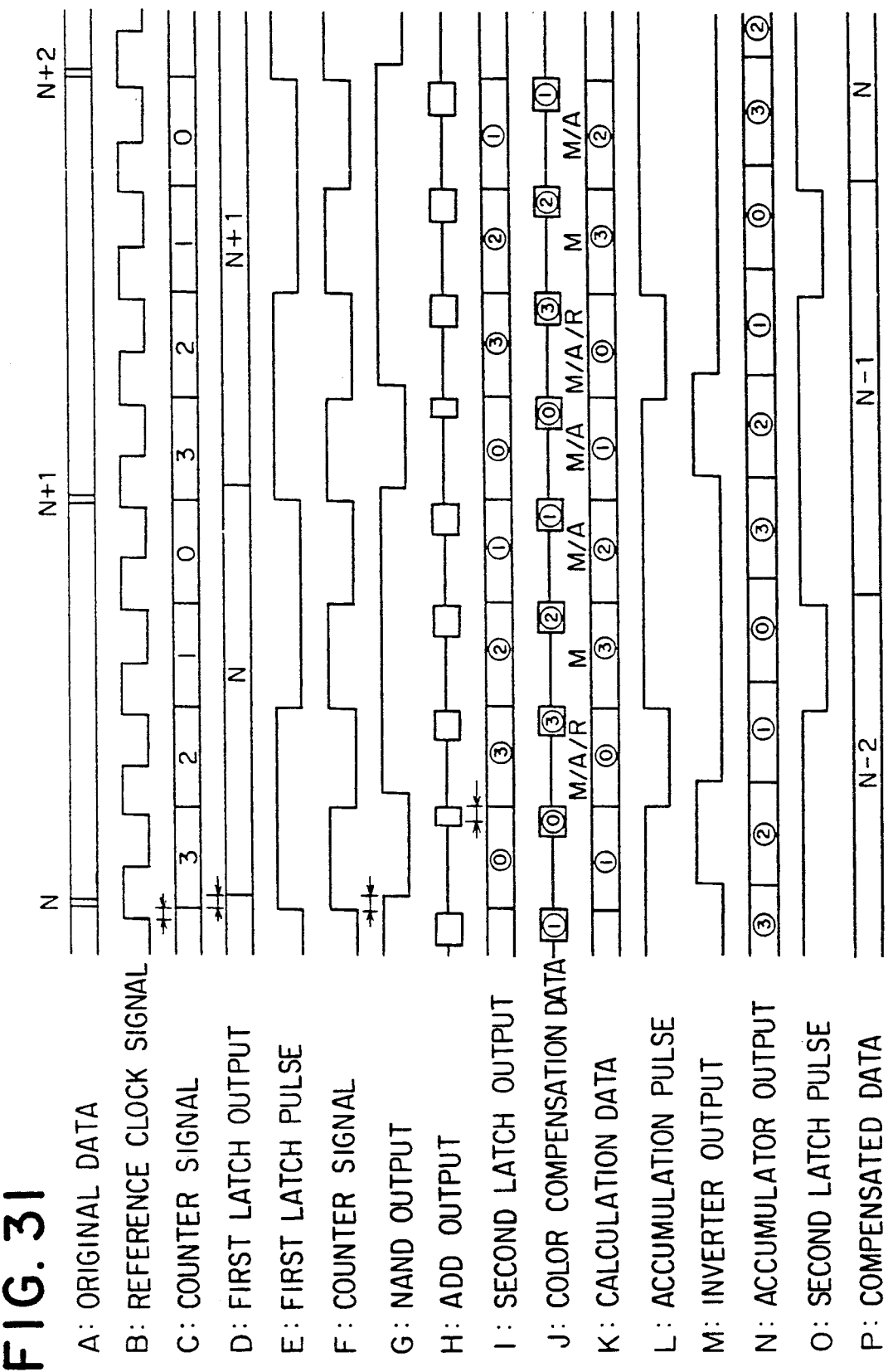
FIGS. 31 to 35 are illustrations for said block diagram.

8-bit image data of R, G, and B supplied to terminals 11R, 11G, and 11B are supplied to and latched by latch circuits 12R, 12G, and 12B respectively (A and D in FIG. 31).

The reference clock signal CLK (B in FIG. 31) supplied to a terminal 14 is supplied to a 4-leveled counter 15. Two-bit count output (C in FIG. 31) of this 4-leveled counter 15 is divided into two parts, the upper bit and the lower bit. The upper bit signal is supplied to the latch circuits 12R, 12G, and 12B as a first latch pulse (E in FIG. 31).

Latch output signals from the latch circuits 12R, 12G, and 12B are divided into two parts, the upper five bits and the lower three bits, to supply a triangular pyramid to be used for individual interpolation. In this case, the upper five bits indicate the reference point or the reference lattice point (vertex A in FIG. 27) of the basic lattice vertexes containing the interpolation point P determined by R, G, and B image data, and the lower three bits indicate the location of the interpolation point P in the basic lattice. In this example, the basic lattice is divided equally by 8 in each direction, and seven interpolation points are provided.

The lower 3-bit- signal is supplied to ROM 17 which functions as a distribution means. A 2-bit counter output signal (E and F in FIG. 31) is supplied from the 4-leveled counter 15 to the ROM 17. The ROM 17 judges the one of the six triangular pyramids formed by the vertexes of the basic lattice, which contains the interpolation point P, on the basis of the lower 3-bit signal, and outputs sequentially distribution signals specifying the vertexes forming the triangular pyramid.

When the coordinates of the interpolation point P are P(5, 1, 2), for example, the coordinates of the vertexes A to H of the basic lattice containing the interpolation point P are determined as shown in FIG. 27. Then, the one of the six triangular pyramids formed by the vertexes A to H of the basic lattice, which contains the interpolation point P, is determined. As shown in FIG. 28A, the triangular pyramid T formed by the vertexes A, B, C, and G is specified.

A(0, 0, 0)
B(8, 0, 0)
C(8, 0, 8)
G(8, 8, 8)

In this case, the vertex B can be specified by moving the position from the vertex A, which is assumed as a reference point, in the X direction by the basic lattice interval (a bit 1 signal equivalent to quantization level 8). The vertex C can be specified by moving the position from the vertex A, which is assumed as a reference point, in the X and Z directions by the basic lattice interval respectively. The vertex G can be specified by moving the position from the vertex A, which is assumed as a reference point, in the X, Y, and Z directions by the basic lattice interval respectively.

To specify the triangular pyramid T formed by the vertexes A, B, C, and G, therefore, the distribution signals indicated below are sequentially outputted from output terminals a, b, and c on the basis of the 2-bit count output of the base 4 system counter 15.

(0, 0, 0)
(1, 0, 0)
(1, 0, 1)
(1, 1, 1)

These distribution signals are supplied to the adders 18R, 18G, and 18B, and added to the upper 5-bit signal. The vertexes A, B, C, and G are calculated, and the triangular pyramid T is then specified.

Since the first distribution signal is (0,0,0), the position cannot be moved by adding the distributions signal to the reference lattice point (0, 0, 0) and the vertex A is specified. When the next distribution signal (1, 0, 0) is added to the reference lattice point (0, 0, 0), (1, 0, 0), the quantization level is (8, 0, 0), is obtained, and the vertex B is specified. When the next distribution signal (1, 0, 1) is added to the reference lattice point (0, 0, 0), (1, 0, 1), the quantization level is (8, 0, 8), is obtained, and the vertex C is specified. When the next distribution signal (1, 1, 1) is added to the reference lattice point (0, 0, 0), (1, 1, 1), the quantization level is (8, 8, 8), is obtained, and the vertex G is specified.

Figure 29:
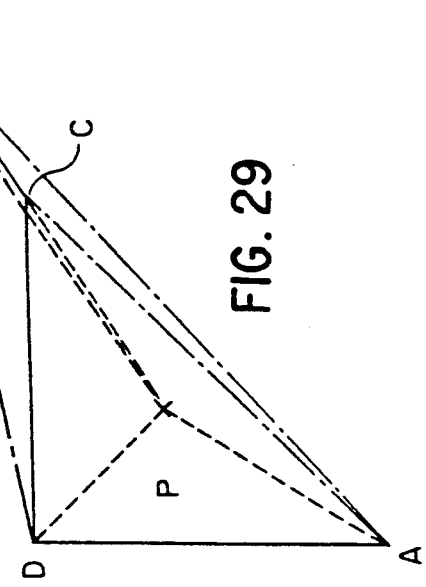

When the coordinates of the interpolation point P are P(3, 1, 5), for example, the triangular pyramid containing the interpolation point P is as shown in FIG. 29. Therefore, to specify the triangular pyramid T formed by the vertexes A, B, C, and G, the distribution signals indicated below are sequentially outputted from the output terminals a, b, and c on the basis of the 2-bit count output of the base 4-leveled counter 15.

(0, 0, 0)
(1, 0, 1)
(0, 0, 1)
(1, 1, 1)

These distribution signals are supplied to the adders 18R, 18G, and 18B, and added to the upper 5-bit signal. The vertexes A, C, D, and G are calculated, and the triangular pyramid T is then specified.

Signals (H in FIG. 31) specifying the vertexes of the triangular pyramid T, which are outputted from the adders 18R, 18G, and 18B, are supplied to and latched by latch circuits 19R, 19G, and 19B (I in FIG. 31). The reference clock signal CLK to be supplied to the terminal 14 is supplied to the latch circuits 19R, 19G, and 19B as a latch pulse.

Latch output signals from the latch circuits 19R, 19G, and 19B are supplied to color correction data generation means 20Y, 20M, 20C, and 20K for yellow Y, magenta M, cyan C, and black K to generate Y, M, C, and K image data.

The configuration of the color correction data generation means 20Y is as follows:

The latch output signals from the latch circuits 19R, 19G, and 19B are supplied to a color reproduction ROM 21Y, and the coordinates of the corresponding vertexes of a new triangular pyramid T' which is obtained by mapping the triangular pyramid T onto a different color specification system are referred to. Y image data corresponding to the vertexes of the basic lattice is stored in the color reproduction ROM 21Y and referred to by the latch output signals from the latch circuits 19R, 19G, and 19B.

In the color reproduction ROM, for example, Y image data out of Y, M, C, and K image data, generated by the 100% UCR method mentioned above, or by the improved 100% UCR method, is stored.

Y image data (J in FIG. 31) sequentially outputted from the color reproduction ROM 21Y is supplied to a multiplication and accumulation means 22Y, and weight factors are sequentially supplied from the weight factor ROM 30 via a latch circuit 31 to the multiplication and accumulation means 22Y to perform multiplication and accumulation. The reference clock signal CLK to be supplied to the terminal 14 is supplied to this multiplication and accumulation means 22Y.

In this case, the lower 3-bit signals of latch output from the latch circuits 12R, 12G, and 12B are supplied to the weight factor ROM 30, and a 2-bit count output signal from the 4-leveled counter 15 is supplied to this weight factor ROM 30, and weight factors determined by the volume of a triangular pyramid newly formed by the vertexes forming the triangular pyramid T and by the interpolation point P are sequentially referred to.

For the triangular pyramid T in FIG. 28A, for example, the following four weight factors are referred to.

V BCGP, V ACGP, V ABGP, V ABCP

A weight factor, which is outputted from the weight factor ROM 30, is latched by the latch circuit 31, and supplied to the multiplication and accumulation means 22Y, and the operation indicated by the equation below is executed. The reference clock signal CLK to be supplied to the terminal 14 is supplied to the latch circuit 31 as a latch pulse.

$$P'(Y) = 1/V \ ABCG \ (V \ BCGP.A' + V \ ACGP.B' + V \ ABGP.C' + V \ ABCP.G')$$

K in FIG. 31 shows data under operation. M indicates multiplication, A accumulation, and R rounding.

The multiplication and accumulation means 22Y outputs the operation result whenever multiplication is performed (N in FIG. 31), which is supplied to and latched by a latch circuit 23Y. The final operation result is outputted from the latch circuit 23Y as interpolation data Y (P in FIG. 31).

To perform the operations mentioned above with the predetermined timing, a control circuit 40 comprising a logical circuit can be set. A 2-bit count output signal (E and F in FIG. 31) from the 4-leveled counter 15 is supplied to a NAND circuit 41, and an output signal (G in FIG. 31) from the NAND circuit 41 is supplied to and latched by a latch circuit 43. A latch output signal (L in FIG. 31) from the latch circuit 43 is supplied to the multiplication and accumulation means 22Y as an accumulation pulse.

A latch output signal from the latch circuit 43 is supplied to a latch circuit 44, and a latch output signal from the latch circuit 44 is supplied to the latch circuit 23Y as a second latch pulse (O in FIG. 31). The reference clock signal CLK to be supplied to the terminal 14 is supplied to the latch circuits 43 and 44.

The phase of an output signal from the NAND circuit 41 is reversed by an invertor 42, and an output signal (M in FIG. 31) from the invertor 42 is supplied to the multiplication and accumulation means 22Y as a rounding pulse.

A ROM with a capacity of 256K bits, for example, can be used as a color reproduction ROM 21Y. 32 points are extracted between the minimum and maximum levels of R, G, and B image data, and Y image data at $32 \times 32 = 32768$ points are stored.

In this case, R, G, and B image data are 8 bits long, and comprise 256 gradations. 32 points can be obtained by delimiting all the points every 8 points starting at 0 as follows:

0, 8, 16,—, 240, 248

The 33rd point, which is between 249 and 255, is not used or handled as point 248.

Y image data at such distribution points or at the vertexes of the basic lattice with the basic lattice interval of quantization level 8 is correctly calculated, and the calculated Y image data is stored in the color reproduction ROM 21Y.

When the basic lattice interval is at quantization level 8, the sum of four times of weight factors is:

$$8 \times 8 \times 8/6 = 512/6$$

The sum is normalized to 256. To allow a 8-bit general-purpose IC to be used as a weight factor ROM 30, the sum of four times of weight factors is always kept at 256 and the maximum weight factor is set to 255. When the interpolation point P is in the same position as the vertex A of FIG. 27, for example, the weight factors V BCGP, V ACGP, V ABGP, and V ABCP are as follows (the value in parenthesis is a theoretical values):

| V BCGP. | V ACGP. | V ABGP. | V ABCP |
|---------|---------|---------|--------|
| 255     | 0       | 0       | 1      |
| (512/6) | 0       | 0       | 0)     |

Since the sum of four times of weight factors is always 256, the division 1/V ABCG of the multiplication and accumulation means 22Y is performed by a 8-bit shift of output. For rounding in this case, the 8th bit from the lowest place, for example, is judged as 1 or 0. When the 8th bit is 1, 1 is added to the 9th bit.

The color correction data generation means 20M, 20C, and 20K are configured in the same way as the color correction data generation means 20Y mentioned above though no description is provided, and interpolation data M, C, and K are outputted.

In this example, as mentioned above, interpolation is performed using triangular pyramids, which are divided spaced with the minimum number of vertexes, and multiplication and accumulation are performed four times. Therefore, the processing time can be extremely shortened compared with the conventional interpolation method using cubes.

In this example, the basic lattice configured by the vertexes A, B, C, D, E, F, G, and H is divided into six triangular pyramids containing dividing lines in parallel with the achromatic color axis. Therefore, interpolation errors of Y, M, C, and K image data to be stored in the color reproduction ROM can be minimized independently of the 100% UCR method or the improved 100% UCR method.

Figure 32:
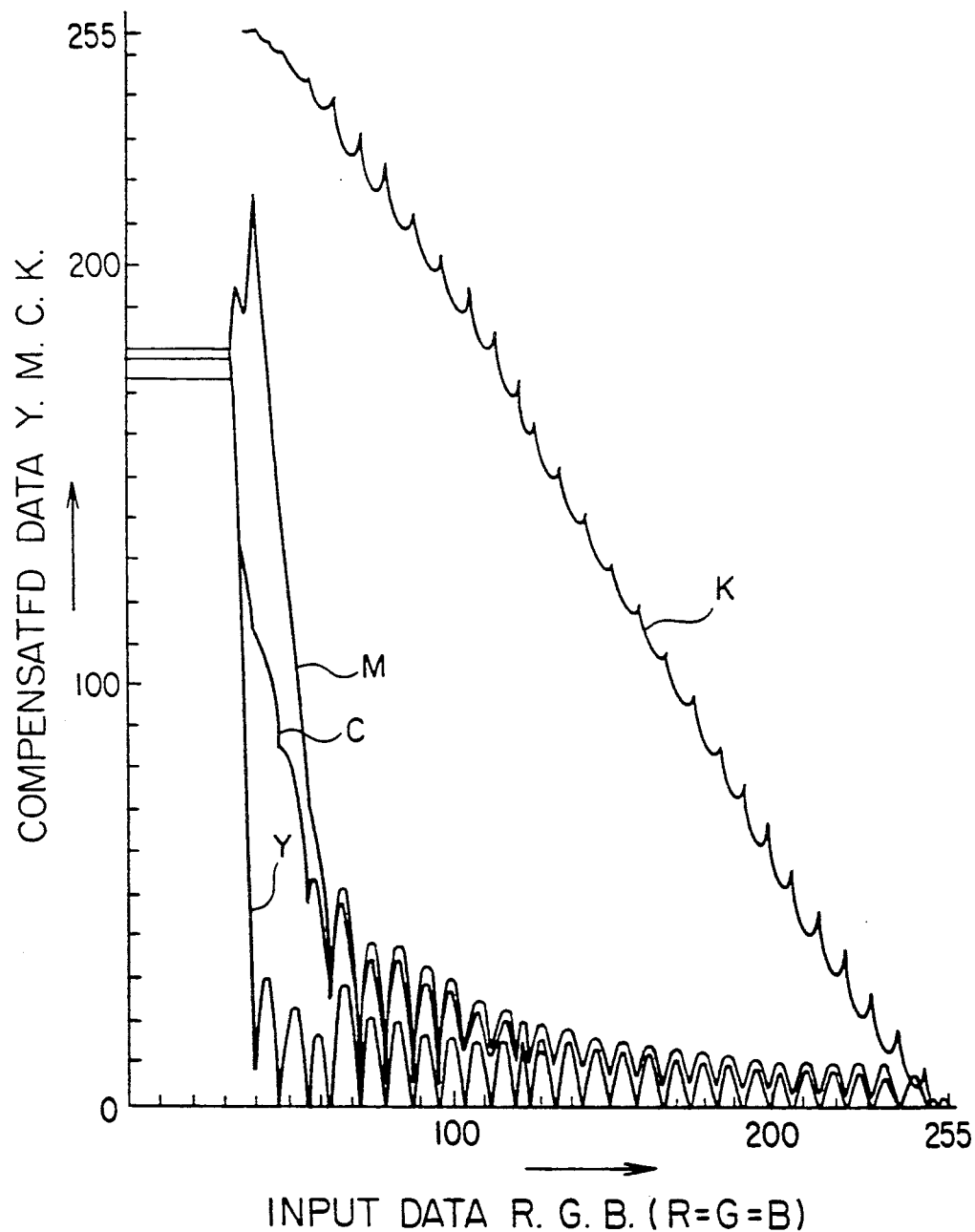

When Y, M, C, and K image data obtained by the 100% UCR method is interpolated by the conventional interpolation method using a cube, Y, M, C, and K image data, as shown in FIG. 32, cannot be interpolated smoothly but undulatingly. The figure shows 8-bit (0 to 255) input R, G, and B image data, which is converted output Y, M, C, and K image data. The most numerous are K image data due to a gray wedge (R=G=B). The undulated portions are data points, and the curved portions are interpolated points.

Figure 33:
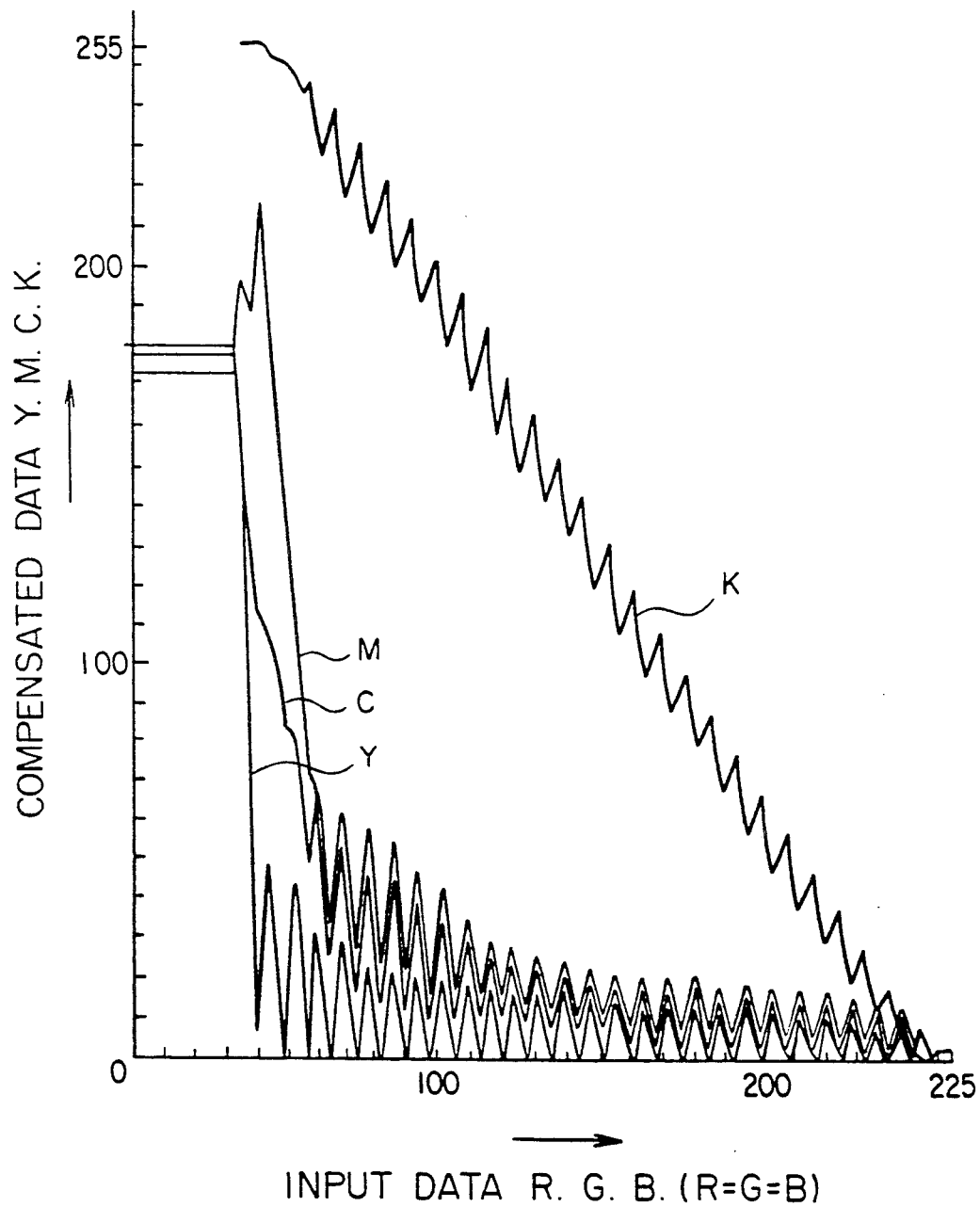

When triangular pyramids, formed from the basic lattice, containing dividing lines intersecting the achromatic color axis orthogonally are used for interpolation, Y, M, C, and K image data, as shown in FIG. 33, cannot be interpolated smoothly but undulatingly.

Figure 34:
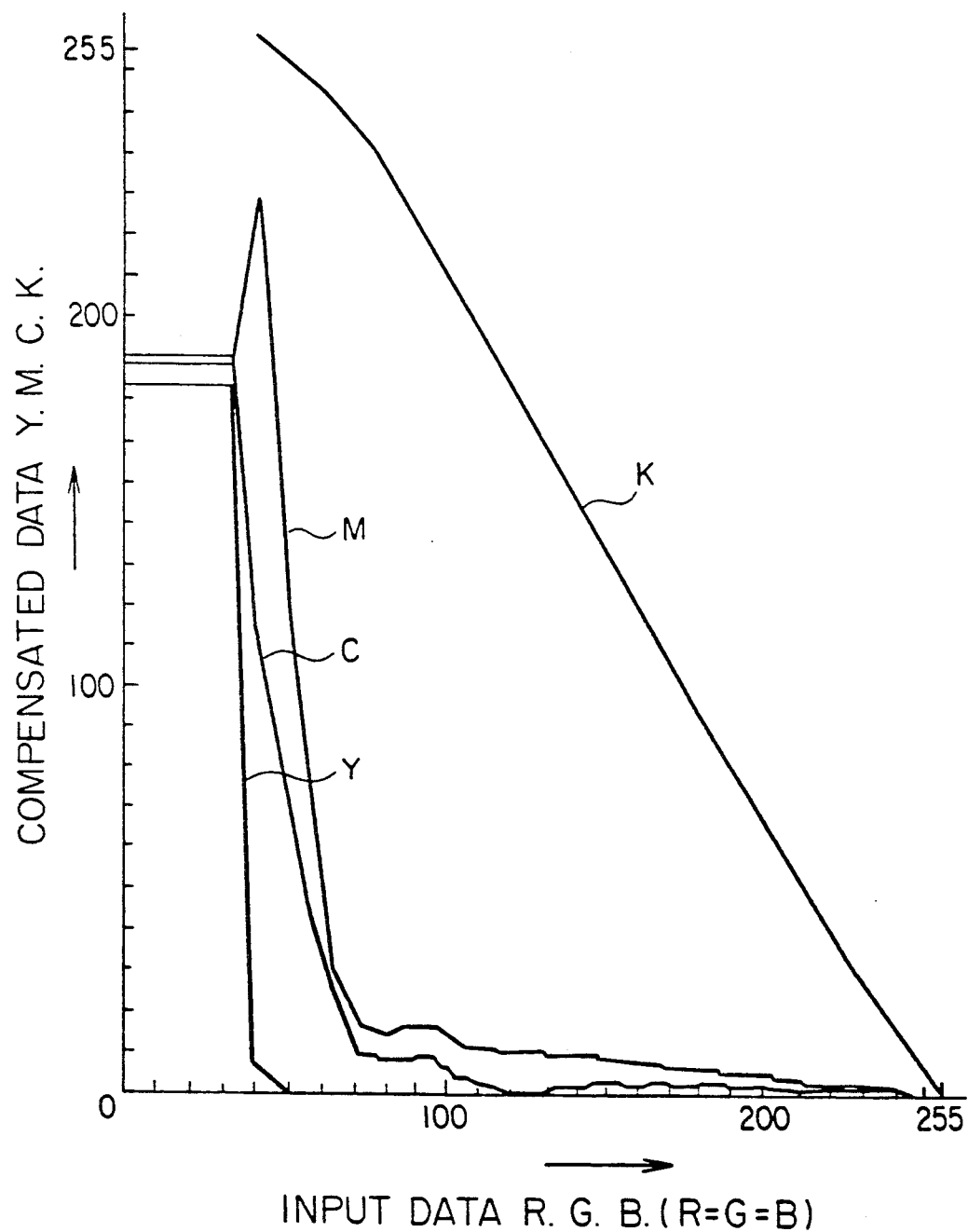

In this example, triangular pyramids, formed from the basic lattice, containing dividing lines in parallel with the achromatic color axis are used to interpolation, and Y, M, C, and K image data, as shown in FIG. 34, can be smoothly interpolated.

The foregoing can be modeled as shown in FIG. 35.

In this example, it is assumed that two-dimensional input is outputted by the height shown by the arrow. Output data is changed in a V-shape state. The height of the arrow at the bottom of the V shape can be minimized by the UCR method, for example, to 0 by the 100% UCR method.

Figure 35A:
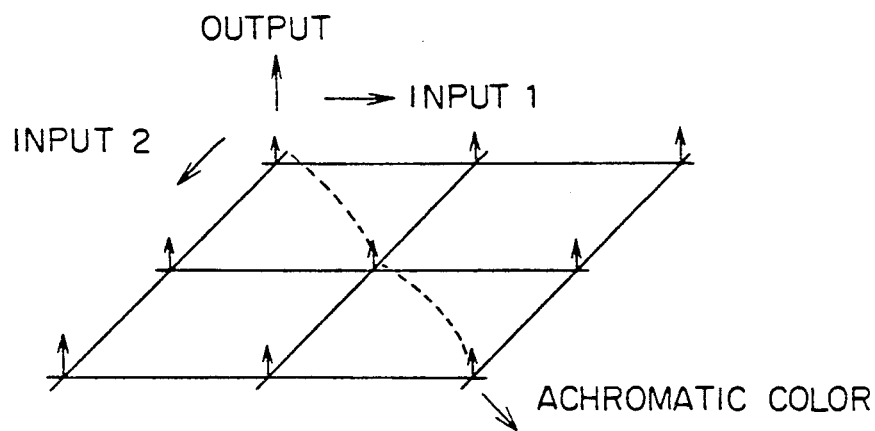

FIG. 35A shows an interpolation model using a cube, and the bottom of the V shape is curvedly interpolated as shown by a dotted line.

Figure 35B:
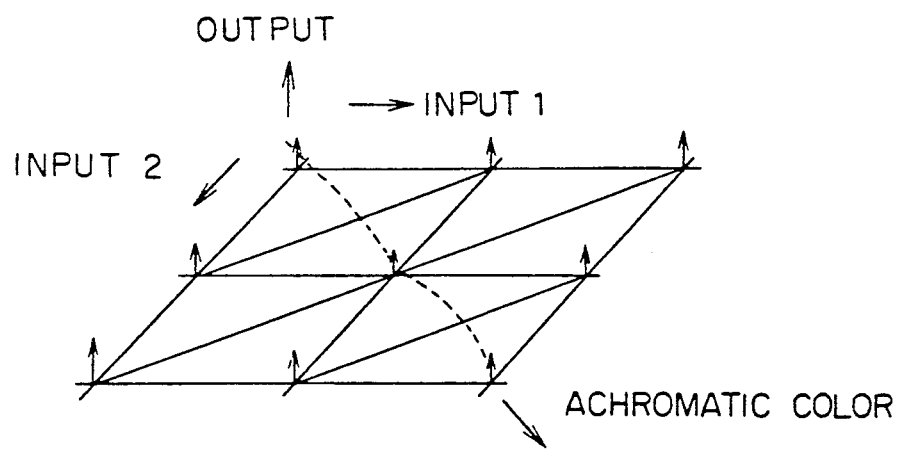

FIG. 35B shows an interpolation model using triangular pyramids, formed from the basic lattice, containing dividing lines intersecting the achromatic color axis orthogonally for interpolation. The bottom of the V shape is interpolated in a triangular wave state as shown by a dotted line.

Figure 35C:
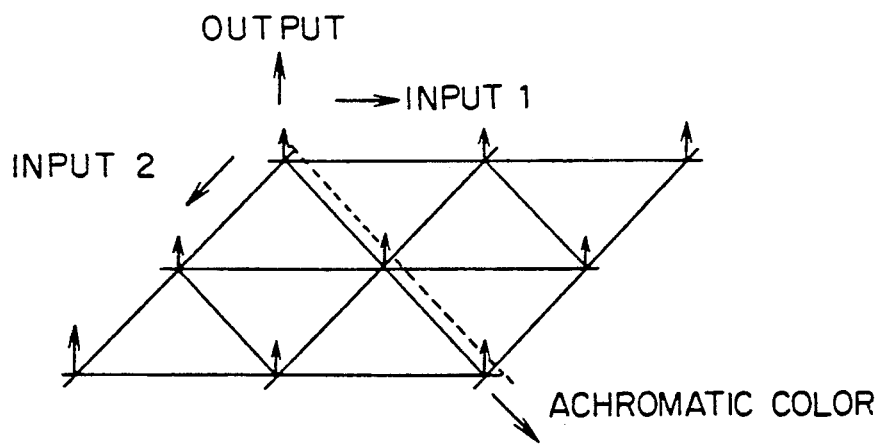

FIG. 35C shows an interpolation model using triangular pyramids, formed form the basic lattice, containing dividing lines in parallel with the achromatic color axis for interpolation. The bottom of the V shape can be smoothly interpolated as shown by a dotted line.

In the above embodiment of the device, Y, M, C, and K image data to be stored in the color reproduction ROM, as mentioned above, is generated by the 100% UCR method or the improved 100% UCR method. However, to Y, M, C, and K image data to be stored in the ROM, which is generated by the general UCR method, the present invention can be applied to produce the same effect.

In the above embodiment of the device, four color correction data generation means 20Y to 20K are provided to allow for parallel interpolation of Y, M, C, and K image data. However, a method, that Y, M, C, and K image data is stored in a color reproduction ROM using one color correction data generation means, and image data outputted from the color reproduction ROM are sequentially switched to Y, M, C, and K, and the switched image data of Y, M, C, and K are sequentially interpolated, may be used.

In the above second embodiment of the device, 3 input data are used. The inverter also confirmed the fact of the present invention that the number of the necessary data for the interpolation is one greater than the number of the input data. Therefore, the present invention can be applied to 4 inputs or other cases. In the case of 4 inputs, for example, four-dimensional triangular pyramids (hyper-triangular pyramids) can be used for interpolation. In this case, 24 hyper-triangular pyramids may be formed from the basic lattice which is divided so that said hyper-triangular pyramids contain dividing lines in parallel with the achromatic color axis (Gray Scale).

As described above, the present invention allows for interpolation using divided spaces with a minimum number of vertexes, and the interpolation time can be shortened. Divided spaces with a minimum number of vertexes can be formed so that the divided spaces contain a dividing line in parallel with the achromatic color axis, and interpolation errors can be extremely minimized.

What is claimed is:

1. A method of determining a density combination of Yellow, Magenta, Cyan, and Black color components representing a color expressed in a color space defined by a range of densities of said color components, said method comprising the step of;

providing a predetermined number of color patches, each one of said color patches representing a region expressing a predetermined color in said color space, and having a combination of Yellow, Magenta, Cyan, and Black color densities, said combination of color densities for each of said color patches being selected so that the Black color component in the combination is at the maximum density possible while maintaining the expression of the predetermined color represented by each of said color patch; and determining a density combination representing another region, excluding said regions expressing each of said predetermined colors in said color space, according to at least one of said color patches.

2. The method according to claim 1, wherein a lower number of said color patches are provided for colors which require higher densities of said Black color component than for colors which require lower densities of said Black color component.

3. A color data processing apparatus for determining a density combination of Yellow, Magenta, Cyan, and Black color components to represent a color comprising a plurality of color component data, said apparatus comprising:

memory means for storing a plurality of reference data wherein a number, one greater than the number of said plurality of color component data, of said plurality of reference data provides a data group forming a tetrahedron in a color space, at least one side of said tetrahedron progressing parallel to a Grey Scale in said color space data generating means for generating a plurality of compensation data, each of said compensation data compensating for a difference between said plurality of reference data and said color component data, and processing means for determining said density combination corresponding to said color component data by processing said color component data with said plurality of reference data and compensation data.

4. The apparatus of claim 3, wherein said memory means comprises a predetermined number of color patches, each one of said color patches representing a region of a predetermined color in a color space, and said each one of said color patches being used as one of said reference data, and wherein said color space is defined by a range of densities of Yellow, Magenta, Cyan, and Black color components, and said density combination is determined so that Black color component is at maximum density possible while maintaining the expression of the predetermined color of said color component data.

5. The apparatus of claim 4, wherein said plurality of color component data are Red, Green, and Blue.

* * * * *

UNITED STATES PATENT AND TRADEMARK OFFICE
CERTIFICATE OF CORRECTION

PATENT NO. : 5,121,196
DATED      : June 9, 1992
INVENTOR(S) : Hung Pochieh

It is certified that error appears in the above-identified patent and that said Letters Patent is hereby corrected as shown below:

Claim 1, column 18, line 57, change "step" to --steps--;

line 68, change "patch" to --patches--.

Abstract, line 4, change ";" to --:--; and

Title page, column 1, change Inventor's name from "Pochieh Hung" to --Hung Pochieh--.

Signed and Sealed this

Fourteenth Day of September, 1993

Attest:

BRUCE LEHMAN

*Attesting Officer*      *Commissioner of Patents and Trademarks*